(12) United States Patent
Duyvesteyn

(10) Patent No.: US 7,985,333 B2
(45) Date of Patent: Jul. 26, 2011

(54) SYSTEM AND METHOD OF SEPARATING BITUMEN FROM TAR SANDS

(75) Inventor: Willem P C Duyvesteyn, Reno, NV (US)

(73) Assignee: Marathon Oil Canada Corporation, Calgary, Alberta (CA)

( * ) Notice: Subject to any disclaimer, the term of this patent is extended or adjusted under 35 U.S.C. 154(b) by 637 days.

(21) Appl. No.: 12/041,554

(22) Filed: Mar. 3, 2008

(65) Prior Publication Data

US 2008/0210602 A1 Sep. 4, 2008

Related U.S. Application Data

(63) Continuation-in-part of application No. 11/249,234, filed on Oct. 12, 2005.

(60) Provisional application No. 60/617,739, filed on Oct. 13, 2004.

(51) Int. Cl.
 C10G 1/04 (2006.01)
(52) U.S. Cl. .................................. 208/390; 208/45
(58) Field of Classification Search .............. 208/45, 208/390
 See application file for complete search history.

(56) References Cited

U.S. PATENT DOCUMENTS

| | | | |
|---|---|---|---|
| 2,871,180 A | 1/1959 | Lowman et al. | |
| 3,131,141 A | 4/1964 | West | |
| 3,527,692 A | 9/1970 | Titus | |
| 3,779,902 A | 12/1973 | Mitchell et al. | |
| 4,035,282 A | 7/1977 | Stuchberry et al. | |
| 4,046,668 A | 9/1977 | Farcasiu et al. | |
| 4,120,773 A | 10/1978 | Ridgway | |
| 4,120,777 A | 10/1978 | Globus | |
| 4,139,450 A | 2/1979 | Hanson et al. | |
| 4,308,133 A | 12/1981 | Meyer | |
| 4,347,118 A | 8/1982 | Funk et al. | |
| 4,490,259 A | 12/1984 | Coffing | |

(Continued)

FOREIGN PATENT DOCUMENTS

WO WO 01/32936 5/2001

(Continued)

OTHER PUBLICATIONS

Lewis, Richard J., Sr. (2002)."Liquefied Petroleum Gas", Hawley's Condensed Chemical Dictionary (14th Edition). John Wiley & Sons. Online version available at: http://knovel.com/web/portal/browse/display?_EXT_KNOVEL_DISPLAY_bookid=704& VerticalID=0.*

(Continued)

*Primary Examiner* — Walter Griffin
*Assistant Examiner* — Renee E Robinson
(74) *Attorney, Agent, or Firm* — Holland & Hart LLP

(57) ABSTRACT

Various methods and systems for obtaining bitumen from tar sands are disclosed. The disclosed methods and/or systems can be used to economically achieve a high degree of bitumen recovery from tar sands. The method may include a primary leaching or extraction process that separates most of the bitumen from the tar sands and results in a bitumen-enriched component and a bitumen-depleted component. The bitumen-enriched component includes mainly solvent and bitumen. The bitumen-depleted component includes mainly water and mineral solids with some residual bitumen and solvent. The bitumen-depleted component may be mixed with liquefied petroleum gas, e.g., propane and/or butane, to further separate the residual solvent and bitumen. The disclosed system can include separators configured to separate the various components at the various stages in the process.

13 Claims, 7 Drawing Sheets

U.S. PATENT DOCUMENTS

| | | |
|---|---|---|
| 4,589,980 A | 5/1986 | Keys |
| 4,596,651 A | 6/1986 | Wolff et al. |
| 4,612,113 A | 9/1986 | Kallioinen |
| 4,678,561 A | 7/1987 | Keys |
| 4,678,562 A | 7/1987 | Keys |
| 4,744,890 A | 5/1988 | Miller et al. |
| 4,859,317 A | 8/1989 | Shelfantook et al. |
| 5,143,598 A | 9/1992 | Graham et al. |
| 5,176,802 A | 1/1993 | Duyvesteyn et al. |
| 5,223,148 A | 6/1993 | Tipman et al. |
| 5,236,577 A | 8/1993 | Tipman et al. |
| 5,389,274 A | 2/1995 | Fernandez |
| 5,443,158 A | 8/1995 | McKenny et al. |
| 5,485,883 A | 1/1996 | Rippetoe et al. |
| 5,520,799 A * | 5/1996 | Brown et al. ............ 208/143 |
| 5,538,081 A | 7/1996 | Rippetoe et al. |
| 5,554,301 A | 9/1996 | Rippetoe et al. |
| 5,626,743 A | 5/1997 | Humphreys |
| 5,626,793 A | 5/1997 | Reiffenrath et al. |
| 5,670,056 A | 9/1997 | Yoon et al. |
| 5,702,612 A | 12/1997 | Wang |
| 5,795,466 A | 8/1998 | Kelebek et al. |
| 5,849,201 A | 12/1998 | Bradley |
| 5,876,592 A | 3/1999 | Tipman et al. |
| 5,961,786 A | 10/1999 | Freel et al. |
| 5,968,349 A | 10/1999 | Duyvesteyn et al. |
| 6,007,709 A | 12/1999 | Duyvesteyn et al. |
| 6,036,849 A | 3/2000 | Rippetoe et al. |
| 6,074,558 A | 6/2000 | Duyvesteyn et al. |
| 6,106,787 A | 8/2000 | Rippetoe |
| 6,214,213 B1 | 4/2001 | Tipman et al. |
| 6,320,148 B1 | 11/2001 | Yoon et al. |
| 6,427,843 B1 | 8/2002 | Clark |
| 6,589,417 B2 | 7/2003 | Taciuk et al. |
| 6,793,079 B2 | 9/2004 | Khan et al. |
| 6,871,743 B2 | 3/2005 | Yoon et al. |
| 2002/0134704 A1 | 9/2002 | Mitchell et al. |
| 2005/0070218 A1 | 3/2005 | Phillips et al. |
| 2005/0092682 A1 | 5/2005 | Phillips et al. |
| 2006/0076274 A1 | 4/2006 | Duyvesteyn et al. |
| 2006/0144760 A1 | 7/2006 | Duyvesteyn et al. |
| 2007/0209971 A1 | 9/2007 | Duyvesteyn et al. |
| 2007/0284283 A1 | 12/2007 | Duyvesteyn et al. |
| 2008/0060257 A1 | 3/2008 | Duyvesteyn |
| 2008/0156702 A1 | 7/2008 | Duyvesteyn |
| 2009/0090654 A1 | 4/2009 | Duyvesteyn et al. |
| 2009/0145809 A1 | 6/2009 | Ledbetter, Jr. et al. |

FOREIGN PATENT DOCUMENTS

| | | |
|---|---|---|
| WO | WO 03/072506 | 9/2003 |
| WO | WO 2007/102819 A1 | 9/2007 |

OTHER PUBLICATIONS

Information on Related Patents and Patent Applications, see the section of the accompanying Information Disclosure Statement Letter entitled "Related Patents and Patent Applications" for further information, Jul. 19, 2007.

Hong and Chao, "A Polar-Nonpolar, Acetic Acid/Heptane, Solvent Medium for Degradation of Pyrene by Ozone," *Ind. Eng. Chem. Res.* 43:7710-7715 (2004).

International Search Report from International Application No. PCT/US2006/08263.

Information about Related Patents and Patent Applications, see the section of the accompanying Information Disclosure Statement Letter entitled "Related Patents and Patent Applications" for further information.

International Search Report from International Application No. PCT/US2006/08263 (5 pgs.).

International Search Report from International Application No. PCT/US2005/03728 (8 pgs.).

* cited by examiner

SYSTEM AND METHOD OF SEPARATING BITUMEN FROM TAR SANDS

CROSS REFERENCE TO RELATED PATENT APPLICATIONS

This patent application is a continuation in part of U.S. patent application Ser. No. 11/249,234, pending, entitled "Method for Obtaining Bitumen from Tar Sands," filed on 12 Oct. 2005, published as U.S. Patent Application Publication No. 2006/0076274, which claims priority to U.S. Provisional Patent Application Ser. No. 60/617,739, filed on 13 Oct. 2004, both of which are incorporated herein by reference in their entireties. In the event of a conflict, the subject matter explicitly recited or shown herein controls over any subject matter incorporated by reference. All definitions of a term (express or implied) contained in any of the subject matter incorporated by reference herein are hereby disclaimed.

BACKGROUND

Tar sands, which are also referred to as oil sands or bituminous sands, is a common name of geological formations that contain bitumen, an extremely heavy type of crude oil. Tar sands can have a variety of compositions but typically include, in addition to bitumen, water and mineral solids. The mineral solids can include inorganic solids such as coal, sand, and clay. Tar sand deposits can be found in many parts of the world, including North America. One of the largest tar sands deposits is in the Athabasca region of Alberta, Canada. In the Athabasca region, the tar sands formation can be found at the surface, although it may be buried as deep as two thousand feet below the surface overburden. Tar sands deposits are measured in barrels equivalent of oil. It is estimated that the Athabasca tar sands deposit contains the equivalent of about 1.7 to 2.3 trillion barrels of oil. Global tar sands deposits have been estimated to contain up to 4 trillion barrels of oil. By way of comparison, the proven worldwide oil reserves is estimated to be about 1.3 trillion barrels.

The bitumen content of tar sands varies from approximately 5 wt % to 21 wt %, with a typical content of approximately 12 wt %. Tar sands also include approximately 1 wt % to 10 wt % water. The remainder is mineral matter such as coal, sand, and clay. Bitumen is best described as a thick, sticky form of crude oil that is so heavy and viscous that it will not flow unless heated or diluted with lighter hydrocarbons. At room temperature, the flowability of bitumen is much like cold molasses.

Extracting usable oil from tar sands typically begins by separating the bitumen from the mineral solids. One conventional process includes mixing the ore with hot water to form a bitumen enriched froth. The froth is separated and further processed to isolate the bitumen product. Conventional water based extraction technologies are capable of separating bitumen from higher grade ore but are unable to economically separate bitumen from lower grade ore. Unfortunately, this means that a significant amount of tar sand ore is not capable of being processed to recover the otherwise valuable bitumen.

Another problem with conventional water based extraction technologies is the low overall recovery rate of bitumen. Unfortunately, conventional extraction processes discharge much of the bitumen in the ore with the tailings. Not only does this reduce the efficiency of the extraction process due to lower recoveries, but it also presents potential environmental problems that must be addressed.

The residual bitumen is not the only problem associated with the tailings from conventional processes. The amount and physical characteristics of the tailings also present significant problems. For example, the tailings from conventional processes typically include two components: (a) wet tailings (commonly referred to as "coarse sand") that contain about 15 wt % water and (b) a stream of a clay/sand mixture (commonly referred to as "fine tailings") that contains 70 wt % water. In some circumstances, the total amount of the tailings may be more than the amount of the mined ore, which means that the tailings cannot be returned to the mined area. Some of the tailings must be discharged elsewhere. This creates numerous environmental problems associated with the disposal of the tailings. Furthermore, the relatively high water content of the tailings may require the tailings to be stored in a pond instead of stacked or piled thereby further increasing the problems associated with disposal of the tailings.

Fine tailings produced by conventional processes may be especially problematic to dispose. Fine tailings are typically made up of clay, sand, water, and residual bitumen. Due to the water entrained in the clays, fine tailings can have a sludge-like consistency that lasts indefinitely. Byproducts such as fine tailings can be stored in ponds, but these ponds are costly to build and maintain and can be damaging to the local environment, including the local water supply.

Many conventional methods for obtaining bitumen from tar sands also have serious technical limitations. For example, many conventional methods use water, which can cause clays in the tar sands to swell and interfere with processing equipment. In addition, some conventional methods result in the undesirable precipitation of soluble asphaltenes.

One example of a conventional method is described in U.S. Pat. No. 4,046,668 (the '668 patent). The '668 patent discloses the extraction of hydrocarbons from tar sands with a mixture of light naphtha having from 5 to 9 carbon atoms per molecule and methanol. The method disclosed in the '668 patent is limited, in part, because it requires the simultaneous use of two solvents, which increases processing costs.

U.S. Pat. No. 4,347,118 (the '118 patent) discloses a method in which pentane is used to extract bitumen from tar sands. The method disclosed in the '118 patent requires the use of two fluidized bed drying zones. Operation of these fluidized bed drying zones requires a large amount of energy, limiting the efficiency of the overall method. Furthermore, the pentane solvent does not solubilize the asphaltene fraction of the bitumen that is not pentane soluble. Thus, this fraction of the bitumen is discharged with the tailings. For Athabasca type bitumen this can amount to 20 wt % to 40 wt % of the total initial hydrocarbon content of the tar sands.

U.S. Pat. No. 5,143,598 (the '598 patent) discloses a method that includes adding heptane to tar sands to form a bitumen-rich heptane phase and then displacing the bitumen-rich heptane phase with water. This method utilizes steam vaporization and condensation, which are low-efficiency processes. Also, the use of heptane, a non-aromatic solvent, in this method can result in the precipitation of the heptane insoluble asphaltene fraction present in the bitumen phase. The heptane insoluble asphaltene fraction is discharged with the tailings. In addition, using water not only generates large amounts of aqueous waste but also creates oil-water emulsions that are very difficult to breakdown. The use of water can also introduce undesirable impurities into bitumen, such as chlorine, and can result in undesirable swelling of clays in the tar sands. Furthermore, the bitumen recovered by this method typically has a low purity and requires additional processing, such as by centrifugation. This further increases the cost of the overall recovery process.

SUMMARY

Disclosed are embodiments of a method and system for obtaining bitumen from bitumen comprising materials such as tar sands. The disclosed method and system may include multiple solvent extraction or leaching steps to separate the bitumen from the tar sands.

The method may include subjecting the tar sands to a first solvent extraction or leaching step in which tar sand ore is mixed with a first hydrocarbon solvent to form a first mixture. The first mixture is separated into a first bitumen-enriched component and a first bitumen-depleted component. The first bitumen-enriched component primarily includes the solvent and the soluble bitumen fraction. The first bitumen-depleted component primarily includes water, mineral solids, and the insoluble bitumen fraction. In the second extraction step, the first bitumen-depleted component is mixed with a second hydrocarbon solvent to form a second mixture. The second hydrocarbon solvent is used to separate additional hydrocarbons (e.g., residual amounts of the first hydrocarbon solvent and additional bitumen) from the first bitumen-depleted component. The second mixture may be separated to produce tailings that have a low hydrocarbon content. The tailings may be subjected to further processing or may be disposed.

Alternatively, the second hydrocarbon solvent may be used in place of the first hydrocarbon solvent to form the first mixture. The first mixture may be separated and the first bitumen-enriched component may be mixed again with the same hydrocarbon solvent. In another embodiment, the first mixture may be mixed with a combination of the first hydrocarbon solvent and the second hydrocarbon solvent. The resulting mixture can be separated into a bitumen-enriched component and a bitumen-depleted component. The bitumen-enriched component may be mixed with another hydrocarbon solvent and separated to produce tailings that have a low hydrocarbon content.

Embodiments of the disclosed method also can include transporting the tar sands and the first hydrocarbon solvent through a pipeline or mixing the tar sands and the first hydrocarbon solvent in a pipeline.

In certain embodiments, tar sands and the first hydrocarbon solvent may be mixed together in any of a number of suitable ways. For example, in one embodiment, the tar sands and the first hydrocarbon solvent may be mixed in a vessel. Sufficient mixing may occur simply by virtue of the manner in which the tar sands and the first hydrocarbon solvent are introduced into the container—e.g., the first hydrocarbon solvent may be introduced at high velocity thereby effectively agitating the contents of the vessel.

In other embodiments, a powered mixing device may be provided to mix the contents of the vessel. In further embodiments, the tar sands may be mixed with the first hydrocarbon solvent in a countercurrent process. In yet another embodiment, the tar sands and the first hydrocarbon solvent may be mixed in a pipe. The second hydrocarbon solvent may be mixed with the first bitumen-depleted component in any of the same ways.

The first mixture can be separated into the first bitumen-enriched component and the first bitumen-depleted component using any suitable method. The first mixture may be separated in a filtration operation, gravity separation operation, or the like. In one embodiment, the liquids and the solids may be separated initially using a settling operation. In another embodiment, the first mixture may be separated using vacuum filtration or pressure filtration. The first bitumen-depleted component is taken from the bottom of the vessel. The vessel used to separate the liquids and solids may be the same vessel that was used to mix the tar sands and the first hydrocarbon solvent, or it may be a separate separation apparatus specifically designed to separate the components.

In certain embodiments, the first bitumen-depleted component is mixed with the second hydrocarbon solvent at an elevated pressure sufficient to maintain the second hydrocarbon solvent in liquid form. This may be desirable when the boiling point of the second hydrocarbon solvent at atmospheric pressure is lower than the process temperature. Suitable pressures may range from approximately 1.1 atmospheres to 10 atmospheres. In other embodiments, the pressure may be approximately 110 kPa to 2000 kPa.

The process may be operated as a continuous, batch, or semi-batch process depending on the circumstances. Continuous processes may be used for large scale implementations of the process while batch may be used in smaller scale implementations. It should be understood that regardless of the size of the process, any suitable configuration of the process may be used.

The first hydrocarbon solvent may be any suitable solvent such as a light aromatic solvent. Exemplary solvents may include toluene, xylene, kerosene, diesel (including biodiesel), gas oil, light distillate, commercially available aromatic solvents such as Solvesso 100, 150, and 200 and/or naphtha. The first hydrocarbon solvent also can include compounds such as benzene and/or aromatic alcohols. In some embodiments, the first hydrocarbon solvent has a boiling point of approximately 75° C. to 375° C.

The second hydrocarbon solvent can include any suitable material or combination of materials that is capable of further separating the first hydrocarbon solvent and/or additional bitumen from the inorganic solids and water. In one embodiment, the second hydrocarbon solvent may include one or more aliphatic compounds having 3 to 9 carbon atoms. In another embodiment, the second hydrocarbon solvent may be cyclo- or iso-paraffin having 3 to 9 carbons or a combination thereof. In yet another embodiment, the second hydrocarbon solvent may include a mixture of any of these hydrocarbons.

In another embodiment, the second hydrocarbon solvent may include liquefied petroleum gas (LPG). The term "liquefied petroleum gas" is used broadly herein to refer to any hydrocarbon gas (hydrocarbons that are gases at ambient temperatures and pressures −25° C. and 1 atm) that has been compressed to form a liquid. Thus, the term LPG encompasses any of the widely available commercial LPG formulations as well as other any other mixture of liquefied hydrocarbon gases. In one embodiment, the LPG may have a boiling point (all boiling points are given at atmospheric pressure unless specified otherwise) of approximately −80° C. to 10° C.

In a preferred embodiment, the second hydrocarbon solvent includes LPG that comprises propane. The LPG includes at least approximately 80 wt % propane, or, desirably, at least approximately 90 wt % propane. In some embodiments, the LPG may be entirely propane or a mixture or propane and propylene.

The second hydrocarbon solvent may include commercially available LPG. Commercial LPG is a natural derivative of both natural gas and crude oil. Commercial LPG is predominantly a mixture of propane and butane (n-butane and/or i-butane) with a small percentage of propylene and/or butylene (any one or combination of the four isomers). In some formulation, commercial LPG may be predominantly or even entirely propane or predominantly or entirely butane. Commercial LPG often contains very small amounts of lighter hydrocarbons such as ethane and ethylene and heavier hydrocarbons such as pentane. Three examples of commercial LPG are shown below in Table 1

TABLE 1

Examples of Commercially Available LPG

| Component | HD-5 Propane | Commercial Propane | Commercial Butane/Propane Mixture |
|---|---|---|---|
| Lighter Hydrocarbons | Min 90% (liq vol.) propane Max 5% (liq. vol.) propylene | Mixture of propane and/or propylene | Mixture of Butane and/or butylenes and propane and/or propylenes |
| Butane and heavier hydrocarbons | 2.5% (liq. vol.) | 2.5% (liq. vol.) | — |
| Pentane and heavier hydrocarbons | — | — | Max 2% (liq. vol.) |
| Residual matter | 0.05 ml | 0.05 ml | — |
| Total Sulfur | 123 PPMW | 185 PPMW | 140 PPMW |

The composition of commercial LPG may vary depending on the season. For example, in the summer, the LPG may include primarily or even entirely butane due to volatilization issues presented by hot summer temperatures. However, in the winter, the LPG may include a 70:30 mixture of butane to propane since the outdoor temperatures are much colder.

The tar sand ore can have a bitumen concentration of approximately 3 wt % to 20 wt %. The process is capable of recovering at least approximately 93 wt %, at least approximately 95 wt %, or at least approximately 97 wt % of the bitumen in the tar sand ore. Most of the bitumen is separated in the first solvent extraction step. In one embodiment, the bitumen concentration of the first bitumen-depleted component is approximately 0.5 wt % to 5 wt %. The second solvent extraction step may be used to separate residual amounts of the first hydrocarbon solvent and additional amounts of bitumen.

The tailings component that is discharged from the process may have a hydrocarbon concentration (bitumen+added solvents) of approximately 0.01 wt % to 5 wt %, or, desirably, a hydrocarbon concentration of approximately 0.5 wt % to 2 wt %. The tailings component may have a hydrocarbon concentration of no more than approximately 5 wt %, no more than approximately 3 wt %, alternatively, no more than approximately 2 wt %, or, in some embodiments, no more than approximately 1 wt %.

Both the first hydrocarbon solvent and the second hydrocarbon solvent can be separated and recycled back to the process. Accordingly, in some embodiments, the first bitumen-enriched component is separated into a bitumen product and a recovered first hydrocarbon solvent. This separation can be performed, for example, with a distillation process where the first bitumen-enriched component is heated to a temperature greater than or equal to the boiling point of the first hydrocarbon solvent, such as approximately 70° C. to 170° C.

These and other embodiments can also include separating the second bitumen-enriched component to recover the second hydrocarbon solvent. This separation can be performed, for example, by flashing the bitumen-enriched component to vaporize the second hydrocarbon solvent. The remaining liquids include bitumen and the first hydrocarbon solvent. The remaining liquids can be separated further to isolate the bitumen and the first hydrocarbon solvent.

The system used to separate the various mixtures in the process can include a variety of separators some of which may also be used as mixers, etc. For example, the first mixture may be separated in a first separator, such as a settling vessel or filter. The first separator may also function as the mixing vessel where the tar sand ore is mixed with the first hydrocarbon solvent. A second separator may be used to separate the second mixture to isolate the hydrocarbons from inorganic solids. The second separator may be an expansion vessel, pipe vessel, autoclave, or the like. A third separator may be used to separate the first bitumen-enriched component from the first mixture to isolate the bitumen product from the first hydrocarbon solvent. The third separator may be a multi-hearth solvent recovery furnace, distillation apparatus, or the like. A fourth separator may be used to separate agglomerations of the bitumen and inorganic solids in the tailings. The fourth separator may be a mechanical screening device that separates the agglomerations based on their size. The system may also include pipelines that are used to route the various components to the separators, vessels, and other components.

It is to be understood that the foregoing is a brief summary of various aspects of some disclosed embodiments. The scope of the disclosure need not therefore include all such aspects or address or solve all issues noted in the background above. In addition, there are other aspects of the disclosed embodiments that will become apparent as the specification proceeds.

The foregoing and other features, utilities, and advantages of the subject matter described herein will be apparent from the following more particular description of certain embodiments as illustrated in the accompanying drawings.

BRIEF DESCRIPTION OF THE DRAWINGS

The preferred and other embodiments are disclosed in association with the accompanying drawings in which.

DETAILED DESCRIPTION

Figure 1:
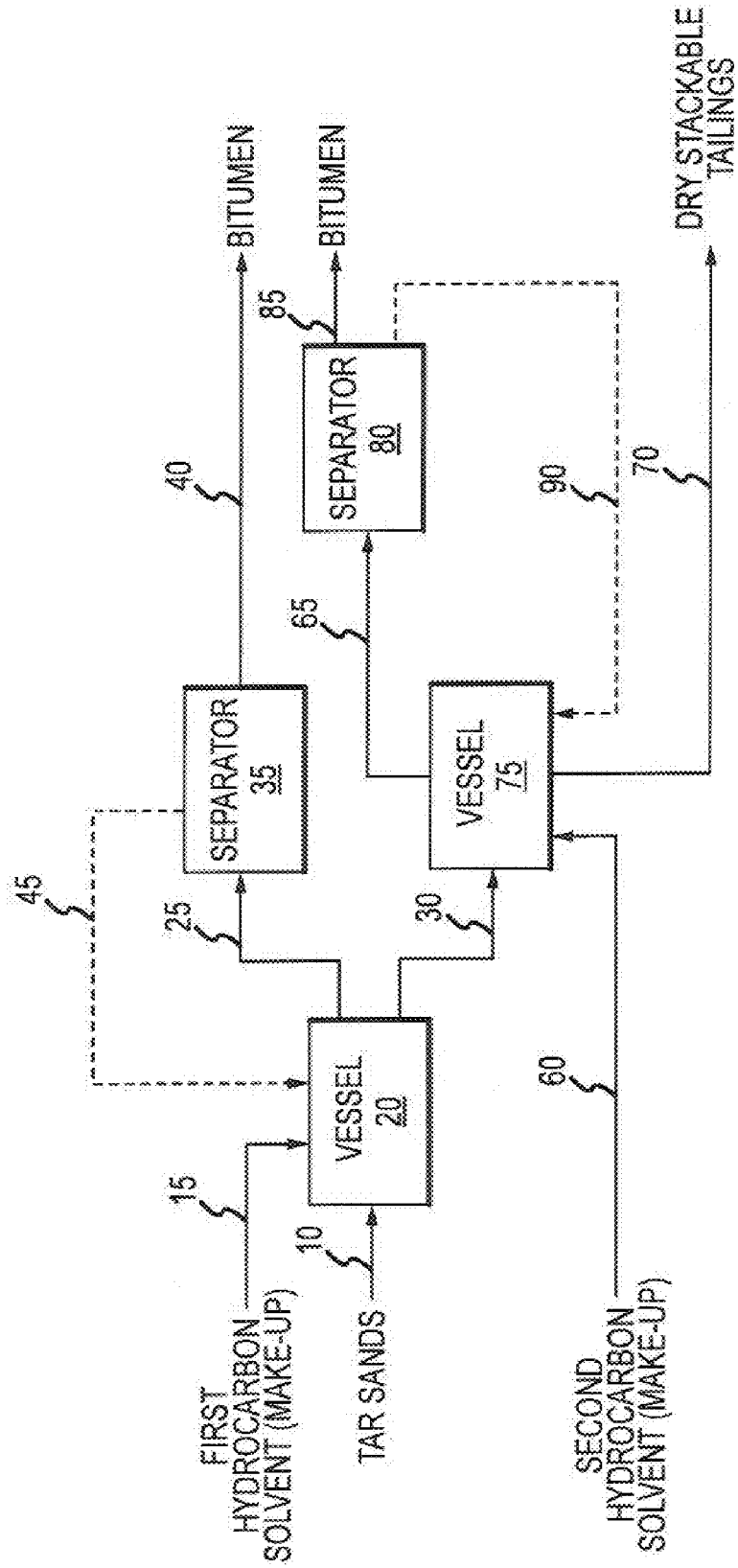
FIG. 1 is a schematic diagram representing embodiments of a process and apparatus for obtaining bitumen from tar sands.

Before describing the details of the various embodiments herein, it should be appreciated that the terms "solvent," "a solvent" and "the solvent" include one or more than one individual solvent compound unless expressly indicated otherwise. Mixing solvents that include more than one individual solvent compound with other materials can include mixing the individual solvent compounds simultaneously or serially unless indicated otherwise. The separations described herein can be partial, substantial or complete separations unless indicated otherwise. All percentages recited herein are weight percentages unless indicated otherwise.

Various embodiments of a method and system for obtaining bitumen from tar sands are described herein. Tar sands are used throughout this disclosure as a representative bitumen comprising material. As used herein, the phrase "tar sands" includes a variety of compositions that include both bitumen and mineral components. Tar sands typically include sand, clay, bitumen, and water. The bitumen in tar sands typically includes oil, resins, and asphaltenes. Depending on the composition, tar sands can have varying levels of hardness. Some tar sands are found in the form of a rock-like ore. Other tar sands have a granular texture similar to that of sand. Still other tar sands can have a different texture between that of sand and that of rock. The bitumen, once separated from the remainder of the tar sands, can be used in a number of ways. For example, the bitumen may be refined into valuable commodities such as oil and gasoline.

The disclosed embodiments for obtaining bitumen from tar sands can include two or more solvent extraction or solvent leaching operations, and associated apparatus. In general, solvent extraction (also commonly referred to as leaching) is a process of extracting a substance from a solid by dissolving the substance in a liquid. In this situation, the bitumen is dissolved in one or more solvents to extract the bitumen from the other materials in the tar sands, especially the mineral solids.

In some embodiments, the first solvent extraction step includes mixing tar sand ore with a first hydrocarbon solvent. This step separates most of the bitumen into a first bitumen-enriched component. A bitumen product can be obtained by subsequently separating the first bitumen-enriched component to isolate the first hydrocarbon solvent and the bitumen product. The recovered first hydrocarbon solvent can be recycled back to the process. The initial solvent extraction operation also produces a first bitumen-depleted component. The second solvent extraction step includes mixing the first bitumen-depleted component with a second hydrocarbon solvent. The second hydrocarbon solvent is selected to remove most, if not substantially all, of the first hydrocarbon solvent and remaining bitumen from the first bitumen-depleted component. The inorganic solids can be disposed as tailings and the hydrocarbons can be separated to isolate the first hydrocarbon solvent, the second hydrocarbon solvent, and the bitumen product. The first and second hydrocarbon solvents can be recycled back to the process.

A variety of techniques and devices can be used to perform each operation in the various embodiments of the process. For example, in some embodiments, the tar sands and the first hydrocarbon solvent are mixed in a vessel to form a first mixture. The first mixture may be separated into a first bitumen-enriched component and a first bitumen-depleted component by filtering or settling and decanting. In one embodiment, the mixing and filtering/settling can occur in the same vessel or in separate vessels.

The resulting components may be separated further using any of a variety of suitable processes and apparatuses. The first bitumen-enriched component may be separated to isolate the first hydrocarbon solvent and the bitumen product. In one embodiment, this may be done using a distillation process (e.g., steam stripping process, multi-hearth solvent recovery furnace, and the like). The first bitumen-depleted component may be mixed with the second hydrocarbon solvent in a pressurized vessel, such as an autoclave or pipe vessel. A pressurized vessel is used to keep the second hydrocarbon solvent in liquid form. This mixture may be separated into a second bitumen-enriched component and a second bitumen-depleted component.

The second hydrocarbon solvent is recovered from the second bitumen-enriched component by flashing the liquids. The rapid decrease in pressure causes the second hydrocarbon solvent to vaporize and thereby separate from the other hydrocarbons, i.e., the first hydrocarbon solvent and bitumen. Other methods may also be used to recover the second hydrocarbon solvent.

Each of the mixing and separation steps can be performed as a continuous, batch, or semi-batch process. Also, certain process steps might be performed as batch processes and others as continuous processes. Continuous processing is typically used in larger scale implementations. However, batch processing may result in more complete separations than continuous processing.

The first hydrocarbon solvent may include any suitable solvent or mixture of solvents that is capable of solubilizing bitumen. It is also desirable to use a solvent or mixture of solvents that is economical and relatively easy to handle and store. It may also be desirable for the first hydrocarbon solvent to be generally compatible with refinery operations.

In one embodiment, the first hydrocarbon solvent may be a light aromatic solvent. It should be appreciated, however, that a light aromatic solvent is not necessarily 100% aromatic. Instead, a light aromatic solvent may include a mixture of aromatic and non-aromatic compounds. For example, the first hydrocarbon solvent can include greater than zero to about 100 wt % aromatic compounds, such as approximately 10 wt % to 100 wt % aromatic compounds, or approximately 20 wt % to 100 wt % aromatic compounds.

Any of a number of suitable aromatic compounds may be used as the first hydrocarbon solvent. Examples of aromatic compounds that can be used as the first hydrocarbon solvent include benzene, toluene, xylene, aromatic alcohols and combinations and derivatives thereof. The first hydrocarbon solvent can also include compositions, such as kerosene, diesel (including biodiesel), gas oil (e.g., light or medium light gas oil), light distillate, commercial aromatic solvents such as Solvesso 100, Solvesso 150, and Solvesso 200 (also known in the U.S.A. as Aromatic 100, 150, and 200, including mainly $C_{10}$-$C_{11}$ aromatics, and produced by ExxonMobil), and/or naphtha. In some embodiments, the first hydrocarbon solvent has a boiling temperature of approximately 75° C. to 375° C.

Figure 7:
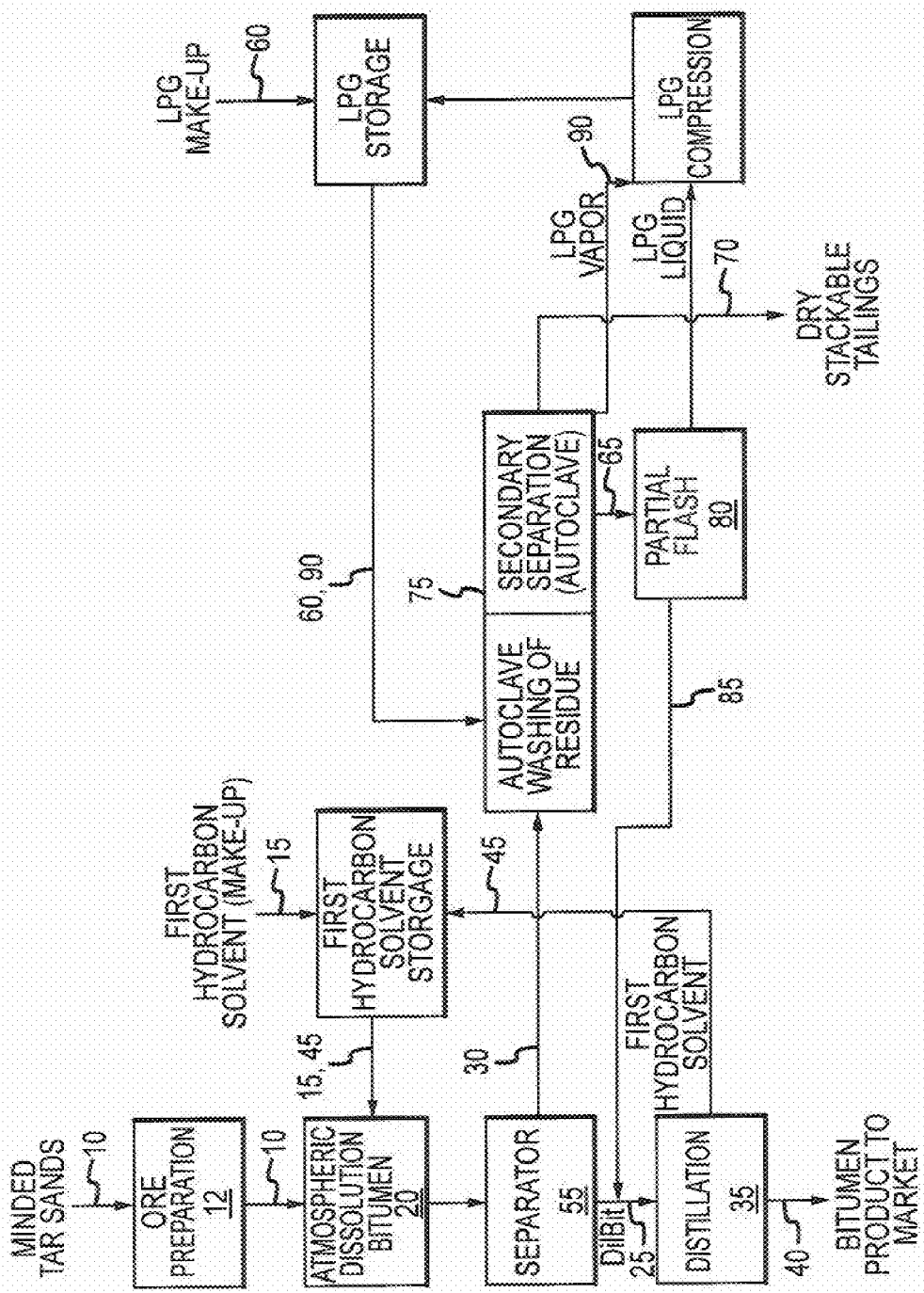

The light distillate may be obtained by cracking a mixture of heavier hydrocarbons such as bitumen or crude oil. For example, the light distillate may be obtained by cracking bitumen using the systems and methods described in U.S. Patent Application Publication No. 2006/0144760, entitled "Nozzle Reactor and Method of Use," filed on 21 Sep. 2005, which is incorporated herein by reference in its entirety. The light distillate may be the light fraction of hydrocarbons separated during distillation of the first bitumen-enriched component as shown in FIG. 7. One potential advantage of using the light distillate is that it is generated on site at the processing location so that it does not have to be shipped from another location.

The other solvents listed are also equally suitable to be used in the process. Naphtha, for example, is particularly effective at dissolving bitumen and is generally compatible with refinery operations. Some examples of kerosene include hydrocarbons having between 9 and 15 carbons per molecule. Some examples of diesel include hydrocarbons having between 15 and 25 carbons per molecule. Some examples of light or medium light gas oil include hydrocarbons having between 13 and 20 carbons per molecule. Some examples of naphtha include hydrocarbons having between 4 and 12 carbons per molecule. These examples are not intended to limit the general meanings of the respective terms.

The second hydrocarbon solvent can be any suitable hydrocarbon solvent that is useful for extracting bitumen and/or any remaining amounts of the first hydrocarbon solvent. In general, the second hydrocarbon solvent is selected so that it effectively solubilizes the bitumen and the first hydrocarbon solvent and so that it can be readily separated from the other hydrocarbons and mineral solids.

In one embodiment, the second hydrocarbon solvent can include one or more aliphatic compounds that are capable of solvating bitumen and/or the first hydrocarbon solvent. Suitable aliphatic compounds can include compounds such as alkanes or alkenes. Any of these aliphatic compounds can be functionalized or non-functionalized. In one embodiment, the second hydrocarbon solvent includes one or more aliphatic hydrocarbons having 3 to 5 carbon atoms. In another embodiment, the second hydrocarbon solvent includes aliphatic hydrocarbons having no more than 5 carbon atoms. The second hydrocarbon solvent may also include lower carbon paraffins, such as cyclo- and iso-paraffins having 3 to 5 carbon atoms. The second hydrocarbon solvent may include one or more of any of the following compounds: methane, ethane, propane, butane, and/or pentane, alkene equivalents of these compounds and/or combinations and derivatives thereof.

In one embodiment, the second hydrocarbon solvent includes LPG. Preferably, the LPG is primarily or even entirely propane. However, other LPG formulations are contemplated including commercially available formulations. The composition of common commercial LPG can vary depending on the time of the year, geographical location, etc. Often, LPG is a mixture of propane and butane with small amounts of propylene and butylene. A powerful odorant such as ethanethiol is typically added to make it easy to detect leaks.

It should be appreciated that LPG may have a wide variety of compositions. For example, LPG may be primarily or entirely propane, or primarily or entirely butane or may not include either of these materials. LPG is stored and transported under pressure to maintain the hydrocarbons as liquids. In one embodiment, LPG has a boiling point at atmospheric pressure of approximately $-80°$ C. to $10°$ C., desirably, approximately $-55°$ C. to $5°$ C., or, suitably, approximately $-35°$ C. to $-5°$ C.

The process and system used to separate bitumen from tar sands may have one or more advantages over conventional methods. For example, the use of hydrocarbon solvents to extract the bitumen prevents swelling of clays in the tar sands that may otherwise occur in a conventional water based process. Clays are generally present as large chunks of consolidated material. Conventional methods that include hot water processing typically require mechanical agitation, which breaks down the chunks into small and swollen clay particles. Retaining the clays in a consolidated form helps to minimize interference with operation of the processing machinery. In addition, bitumen-barren clays that have not been exposed to aqueous solutions typically do not significantly disperse, which enables the clays to be separated by settling and/or filtration processes.

As another example, the process and system may hold certain advantages over conventional one-step processes involving separation of bitumen from tar sands in a pressurized autoclave with an alkane solvent. These conventional processes typically require careful monitoring of the ratio of bitumen to alkane solvent to minimize precipitation of asphaltenes. If the asphaltenes precipitate, they tend to clog various pieces of equipment, such as filters and centrifuges, and the like. This increases the overall cost and complexity of the separation process.

In contrast to these conventional methods, the disclosed method and system avoids many of the problems associated with the precipitation of asphaltenes. The first hydrocarbon solvent is selected so that it solubilizes most, if not substantially all, of the asphaltenes in the tar sands. Since the asphaltenes are solubilized, most are separated in the first extraction step. The second hydrocarbon solvent would normally cause some fraction of the asphaltenes to precipitate. However, since a large majority of the asphaltenes have already been solubilized and dissolved in the first extraction step (approximately 70 wt % to 90 wt %), the second hydrocarbon solvent does not cause significant precipitation of asphaltenes.

The use of LPG as the second hydrocarbon solvent may also provide a number of advantages. For example, commercial LPG is widely available and relatively inexpensive compared to some other organic solvents. Also, the volatility of LPG makes it relatively easy to separate from the other hydrocarbons, e.g., bitumen and/or the first hydrocarbon solvent. For example, the LPG may be separated using something as simple as a flash chamber. The gaseous LPG may be collected from the top of the flash chamber and the remaining liquid comprising bitumen and/or the first hydrocarbon solvent may be collected from the bottom of the flash chamber. The gaseous LPG may be compressed until it is in a liquid state and reused in the process. The bitumen and the first hydrocarbon solvent may be separated from each other by distillation or with some other suitable device or technique.

In one embodiment, the first bitumen-depleted component may be blasted with a gas stream before the first bitumen-depleted component is mixed with the second hydrocarbon solvent. The gas stream is used to blow the liquids off of the solids. The liquids are primarily the first hydrocarbon solvent and any bitumen that is solubilized by the first hydrocarbon solvent. The gas stream dries the wet mineral solids by impacting the lighter liquids and pushing them away from the heavier solids. The liquids may be combined with the first bitumen-enriched component and subject to further processing to separate the first hydrocarbon solvent and the bitumen. Exposing the first bitumen-depleted component to the gas stream increases the overall recovery of bitumen from the tar sands (see the examples section herein for data to show the increased recovery rate). Of course, other techniques such as filtering or settling may also be used to separate the first bitumen-depleted component before it is mixed with the second hydrocarbon solvent.

It should be appreciated that any suitable gas may be used to blow the liquid off the mineral solids. In one embodiment, the LPG in gaseous form may be used. This minimizes the number of different components that are used in the process. Since both the gas purge and the liquid wash use the same material just in a different form, there is no need to stock other materials. In other embodiments, gases such as nitrogen or air may also be used to blow the liquid off the mineral solids.

In one embodiment, the first bitumen-depleted component is exposed to the gas in the same vessel where it is mixed with the second hydrocarbon solvent. Not only does this eliminate the need to filter or settle the first mixture, but it cuts down on the number of times the tar sands must be moved as it is extracted.

With reference to FIGS. 1-7, a number of embodiments are described of suitable processes and systems for extracting bitumen from tar sands. It should be appreciated that the details of the processes and systems shown in these figures can be combined, changed, or otherwise modified to provide additional embodiments. Accordingly, the specific embodiments shown in the Figures and described in the following should not be used to limit the scope of the claims.

In one embodiment, depicted in FIG. 1, tar sands 10 and a first hydrocarbon solvent are routed into a vessel 20 and mixed to form a first mixture. In this embodiment, the first hydrocarbon solvent includes a make-up source 15 and a recycle source 45 of hydrocarbon solvent. The combination of the make-up source 15 and the recycle source 45 form the first hydrocarbon solvent 15, 45 that is mixed with the tar sands 10.

The amount of the first hydrocarbon solvent 15, 45 added to the tar sand ore is sufficient to effectively solubilized at least a portion, or desirably all, of the bitumen in the tar sands 10. In one embodiment, the amount of the first hydrocarbon solvent 15, 45 is approximately 0.05 to 2.0 times the amount of the tar sands 10 by weight, approximately 0.05 to 1.0 times the amount of the tar sands 10 by weight, or approximately 0.1 to 0.5 times the amount of the tar sands 10 by weight. The weight ratio of the first hydrocarbon solvent 15, 45 to bitumen may be approximately 1.5:1 to 20:1, desirably, approximately 2.0:1 to 10:1, or, suitably, approximately 2.5:1 to 5:1. The weight ratio of the first hydrocarbon solvent 15, 45 to bitumen may be no more than approximately 10:1, no more than approximately 8:1, desirably, no more than approximately 5:1, or, suitably, no more than approximately 3:1.

It should be noted that the ratio of the first hydrocarbon solvent 15, 45 to bitumen is affected by the amount of bitumen in the ore. For example, high grade ore (e.g., >12 wt % bitumen) can be processed with a solvent to bitumen ratio as low as 2:1. However lower grade ore (e.g., 6 wt % bitumen) may need to be processed with a solvent to bitumen ratio greater than 3:1 to provide sufficient liquid to fill up the open space between the particles.

The vessel 20 can be selectively opened or closed. In some embodiments, the tar sands 10 are routed into the vessel 20 using a conveyor belt. Conveyor belts are particularly well suited for transporting materials that cannot be transported easily through pipelines. For example, conveyor belts can be useful for transporting tar sands 10 in the form of a brittle ore. The tar sand ore 10 typically has a bitumen concentration of approximately 3 wt % to 20 wt %, approximately 5 wt % to 18 wt %, desirably, approximately 5 wt % to 17 wt % or, suitably, approximately 8 wt % to 14 wt %. It should be appreciated that the amount of bitumen in the tar sand ore 10 can vary significantly depending on its grade.

The vessel 20 can include a mixer for mixing the tar sands 10 and the first hydrocarbon solvent 15, 45. In one embodiment, a motorized mixer may be provided to mix the contents of the vessel 20. In another embodiment, a countercurrent process can be used to facilitate mixing of the tar sands 10 and the first hydrocarbon solvent 15, 45. For example, the tar sands 10 can be introduced near the top of the vessel 20, while the first hydrocarbon solvent 15, 45 is introduced near the bottom of the vessel. The mineral solids in the tar sands 10, which typically are heavier than the first hydrocarbon solvent 15, 45, sink while the first hydrocarbon solvent 15, 45 rises. Mixing occurs as the first hydrocarbon solvent 15, 45 flows upwardly against the downwardly flowing tar sand ore 10.

In another embodiment, the tar sands 10 and the first hydrocarbon solvent 15, 45 can be mixed prior to entering the vessel 20. For example, the tar sands 10 and the first hydrocarbon solvent 15, 45 can be mixed at or near the location at which the tar sands 10 is mined. In this way, the tar sands 10 can be converted into a slurry that can be transported to the vessel 20 through a pipeline. Additional mixing can occur as the slurry flows through the pipeline. The vessel 20 in this embodiment may function primarily as a hopper, holding tank, or separation vessel.

The vessel 20 may function as both a mixer and a separator for separating the first mixture into a first bitumen-enriched component 25 and a first bitumen-depleted component (alternatively referred to as a bitumen-depleted sand component or phase, underflow, or bitumen-depleted tailings component) 30 as shown in FIG. 1. Alternatively, separate vessels can be used for mixing and separating. The first mixture may be separated by, for example, settling the first bitumen-depleted component 30 in the vessel 20. In one embodiment, the vessel 20 may be divided into sections. One section may be used to mix the tar sand ore 10 and the first hydrocarbon solvent 15, 45 and another section may be used to After settling, the first bitumen-depleted component 30 can be extracted from near the bottom of the vessel 20, while the first bitumen-enriched component 25 can be extracted from near the top of the vessel.

Upon exiting the vessel 20, the first bitumen-enriched component 25 includes primarily bitumen and the first hydrocarbon solvent 45. The first bitumen-enriched component 25 may also contain some mineral solids and water. In one embodiment, the amount of the mineral solids may be approximately 0.01 wt % to 5 wt % or approximately 0.1 wt % to 2 wt % of the first bitumen-enriched component 25.

The first bitumen-enriched component 25 exits the vessel 20 and is routed to a separator 35 to recover the first hydrocarbon solvent 45. The process flow of the bitumen-enriched component 25 is shown in FIG. 1. The separator 35 separates the first hydrocarbon solvent 45 from bitumen product 40. The first hydrocarbon solvent 45 is recycled back to the process and mixed with the tar sand ore 10. The separator 35 may also be configured to separate water and mineral solids from the first bitumen-enriched component 25 if necessary.

The separator 35 may be any suitable separator 35 that is capable of separating the first hydrocarbon solvent 45 from the bitumen product 40. In one embodiment, the separator 35 may heat the first bitumen-enriched component 25 and separate the various liquids based on differences in their boiling points, e.g., distillation, etc. The heat can be provided, for example, by a heating unit, such as a heat exchanger. Heating can be done substantially at ambient pressure, at a pressure less than ambient, or at a pressure greater than ambient. The separator 35 also can include a pressure stabilizer to maintain a positive pressure (e.g., an inert gas may be pumped into the separator 35) or a vacuum pump to maintain a negative pressure. In one embodiment, the separator 35 includes a distillation tower (e.g., a vacuum distillation tower).

Table 2 shows the boiling points of some of the components that may be used as or included in the first hydrocarbon solvent 45. In one embodiment, the first bitumen-enriched component 25 may be heated to a temperature of approximately 70° C. to 350° C., such as approximately 70° C. to 170° C., approximately 100° C. to 350° C., approximately 125° C. to 200° C., or desirably, approximately 140° C. to 180° C.

TABLE 2

Solvent Boiling Points

| Compound | Boiling Point ° C. |
|---|---|
| Fatty Acid Methyl Esters | |
| C8 | 187 |
| C10 | 224 |
| C12 | 262 |
| C14 | 295 |
| C16 | 338 |
| C18 | 352 |
| Aromatic Hydrocarbons | |
| Toluene | 111 |
| Xylene | 140 |
| Coal Tar Naphtha | 150-220 |
| Petroleum Naphtha | 172-215 |
| Light distillate | 204-260 |

In another embodiment, the separator 35 may include a multi-hearth solvent recovery furnace. Multi-hearth solvent recovery furnaces typically include alternating arrangements of centrally located hearths and peripherally located hearths. The hearths can be heated, for example, with oil fired muffles and/or high pressure steam coils. In some embodiments, hearths near the top of the furnace are heated to higher temperatures than hearths closer to the bottom of the furnace.

As mentioned above, the first bitumen-enriched component 25 may contain some fine solid material that was not completely separated initially at the vessel 20. The separator 35 may be configured to function despite the presence of this fine solid material. For example, the separator 35 can include a suitable packing material, such as vertical slats, to provide increased surface area for condensation and evaporation. This packing material can be resistant to clogging by the fine solid material. In those embodiments where the separator 35 includes a distillation tower, the fine solid materials may fall to the bottom and be cleaned out periodically.

The first hydrocarbon solvent 45 separated with the separator 35 may be recycled back and mixed with the tar sand ore 10. In one embodiment, the amount of recycled solvent 45 may be sufficient to make it unnecessary to continuously provide make-up solvent 15. Instead, make-up solvent may be added only when the total amount of the first hydrocarbon solvent drops below a threshold level. The ratio of recycled first hydrocarbon solvent 45 to fresh first hydrocarbon solvent 15 may be approximately 2:1 to 200:1, approximately 10:1 to 100:1, or approximately 15:1 to 25:1. In other embodiments, the first hydrocarbon solvent 45 may not be fully recycled back to the process. In these embodiments, the first hydrocarbon solvent 45 may be disposed of or used as a diluent for the transportation of bitumen 40 to the bitumen upgrading and/or refining facility.

After being separated at the vessel 20, the first bitumen-depleted component 30 primarily includes mineral solids and water. The first bitumen-depleted component 30 may also include residual bitumen and the first hydrocarbon solvent 15, 45. In one embodiment, the first bitumen-depleted component 30 includes approximately 0.5 wt % to 5 wt % residual bitumen. In another embodiment, the first bitumen-depleted component 30 includes no more than 5 wt % residual bitumen, no more than 3 wt % residual bitumen, or, desirably, no more than 1 wt % residual bitumen.

The first bitumen-depleted component 30 exits the vessel 20 and is routed to the vessel 75 where the second hydrocarbon solvent 60, 90 is added to form a second mixture. The second hydrocarbon solvent 60, 90 may be a volatile hydrocarbon solvent. A countercurrent process may be used to facilitate mixing of the first bitumen-depleted component 30 and the second hydrocarbon solvent 60, 90 in a similar manner to that described above in connection with mixing the first mixture. In one embodiment, the second hydrocarbon solvent 60, 90 includes LPG.

A sufficient amount of the second hydrocarbon solvent 60, 90 is added to the first bitumen-depleted component 30 to at least partially remove or substantially completely remove any remaining bitumen and/or first hydrocarbon solvent 15, 45. In one embodiment, the ratio of the second hydrocarbon solvent 60, 90 to the first bitumen-depleted component, by weight, is approximately 0.01:1 to 1:1, approximately 0.05:1 to 0.5:1, or approximately 0.05:1 to 0.3:1.

In one embodiment, the vessel 75 can be, for example, a pressurized vessel, such as an autoclave. The second hydrocarbon solvent 60, 90 is added to the vessel 75 in liquid form. The vessel 75 can operate at a pressure and temperature sufficient to maintain the second hydrocarbon solvent 60 in liquid form. The pressure (at 25° C.) can be, for example, between about 110 kPa and about 2000 kPa, such as between about 150 kPa and about 1500 kPa, between about 180 kPa and about 1200 kPa or between about 210 kPa and about 1050 kPa. The temperature in the vessel 75 may be, for example, between about 5° C. and about 150° C., such as between about 10° C. and about 60° C. or, desirably, ambient temperature.

In another embodiment, the second hydrocarbon solvent may be added to the bitumen-depleted component 30 and processed in the manner described in U.S. Patent Application Publication Nos. 2005/0070218 and 2005/0092682, both of which are incorporated herein by reference in their entireties.

After sufficient mixing time, the second mixture is separated into a second bitumen-enriched component 65 (alternatively referred to as a bitumen-enriched volatile hydrocarbon solvent phase) and a tailings component 70 (alternatively referred to as a residual sand component, residual sand phase, or second bitumen-depleted sand component). In one embodiment, the second mixture may be both mixed and separated in the vessel 75, as shown in FIG. 1. However, the second mixture may also be mixed and separated in separate vessels or processes.

The second mixture may be separated using any suitable process or technique that is capable of separating the primarily hydrocarbon liquid from the mineral solids. In one embodiment, the second mixture may be separated using a gravity separation process such as settling. In another embodiment, the second mixture may be separated by filtering.

The tailings component 70 output from the vessel 75 may have a relatively low hydrocarbon content (bitumen+added solvents). In one embodiment, the tailings component 70 has a hydrocarbon concentration of approximately 0.01 wt % and about 15 wt %, such as between about 0.1 wt % and about 10 wt % or between about 0.5 wt % and about 5 wt %. In some embodiments, the tailings component 70 is clean enough to be deposited back into the environment without further processing. In one embodiment, the tailings component 70 may be deposited back in the environment as dry stackable talings. Preferably, the tailings component 70 is deposited back in a location where tar sands ore 10 was previously mined.

In one embodiment, additional bitumen may be separated from the tailings component 70 before it is disposed of. A large amount of the bitumen (along with other hydrocarbons such as the added solvents) in the tailings component 70 is present in the form of agglomerations of mineral particles and bitumen, sometimes referred to as "tar balls." These agglomerations tend to be significantly larger than the mineral particles. Therefore, a screening operation (e.g., dry screening or otherwise) may be used to further separate the tar balls and recycle them back to the process with the tar sand ore 10. This may allow the process to recover approximately 25 wt % to 90 wt % of the contained hydrocarbon content of the tailings component 70.

After being separated at the vessel 75, the second bitumen-enriched component 65 primarily includes the first hydrocarbon solvent 15, 45, the second hydrocarbon solvent 60, and bitumen. The second bitumen-enriched component 65 may also include some small amounts of mineral solids and water.

The second bitumen-enriched component 65 is routed to a separator 80 after exiting the vessel 75, as shown in FIG. 1. In some embodiments, the second bitumen-enriched component 65 is under pressure as it is introduced into the separator 80 to keep the second hydrocarbon solvent 60 in the liquid phase. The separator 80 is used to separate the second hydrocarbon solvent in the second bitumen-enriched component 65 from a bitumen product 85. It should be appreciated that almost any remaining amounts of the first hydrocarbon solvent 15 are separated into the bitumen product 85.

In one embodiment, the second hydrocarbon solvent 60 is separated from the second bitumen-enriched component 65 by rapidly reducing the pressure in the separator 80, which causes the second hydrocarbon solvent 60 to (partially) vaporize. The second hydrocarbon solvent vapor 90 is removed from the separator 80, recompressed into liquid form and then recycled back into the vessel 75. In some embodiments, the amount of recycled second hydrocarbon solvent 90 may be sufficient to eliminate the need to continually add make-up solvent 60. The ratio of the recycled second hydrocarbon solvent 90 to the fresh second hydrocarbon solvent 60 may be approximately 5:1 to 250:1, approximately 10:1 to 150:1, or approximately 25:1 to 100:1. The bitumen product 85 may undergo further processing to create oil or other useful products or the bitumen product 85 may be routed through the separator 35 to separate the first hydrocarbon solvent 15 from the bitumen product.

In some embodiments, the separator 80 may be constructed as a separate unit operation but as an integral part of vessel 75 with the mixed solvent slurry being filtered as it partially flashes and leaves the vessel 75. The mixed bitumen/second solvent product can be further partially flashed, producing a liquid second solvent for recompression and a bitumen phase can be combined with the bitumen.

Figure 2:
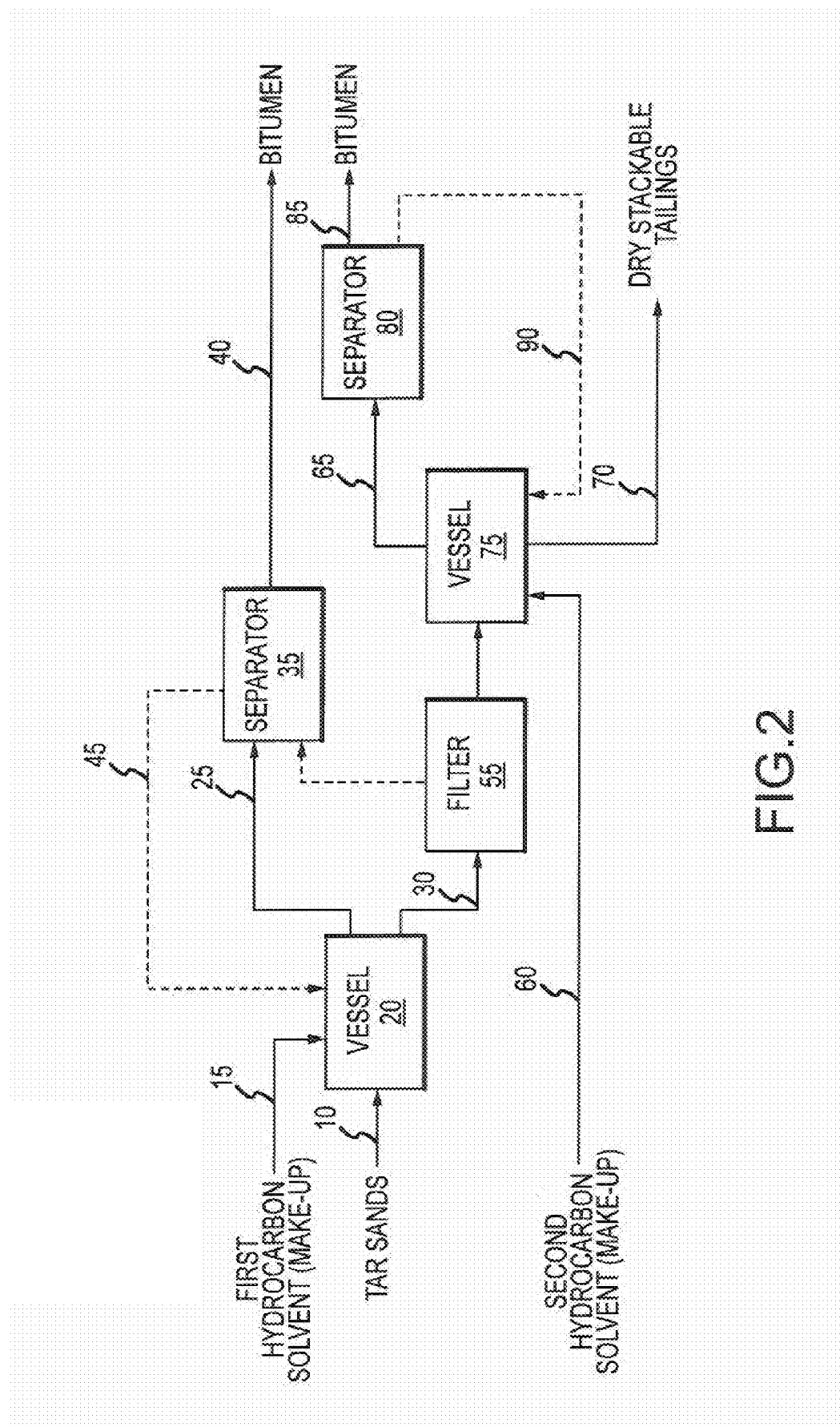
FIG. 2 is a schematic diagram representing embodiments of a process and apparatus for obtaining bitumen from tar sands including a filtration step/device.

Another embodiment of a method and system for separating bitumen from tar sands 10 is shown in FIG. 2. This embodiment is similar to that described in connection with FIG. 1 except that this embodiment includes a filter 55 that is used to pre-filter the first bitumen-depleted component 30 before it is mixed with the second hydrocarbon solvent 60 in the vessel 75. The filter 55 is used to remove additional amounts of the first hydrocarbon solvent 15 and bitumen from the first bitumen-depleted component 30 and send it to the separate 35. The filter 55 may reduce the amount of the second hydrocarbon solvent 60, 90 that is necessary to solubilized the hydrocarbons in the second mixture.

Figure 3:
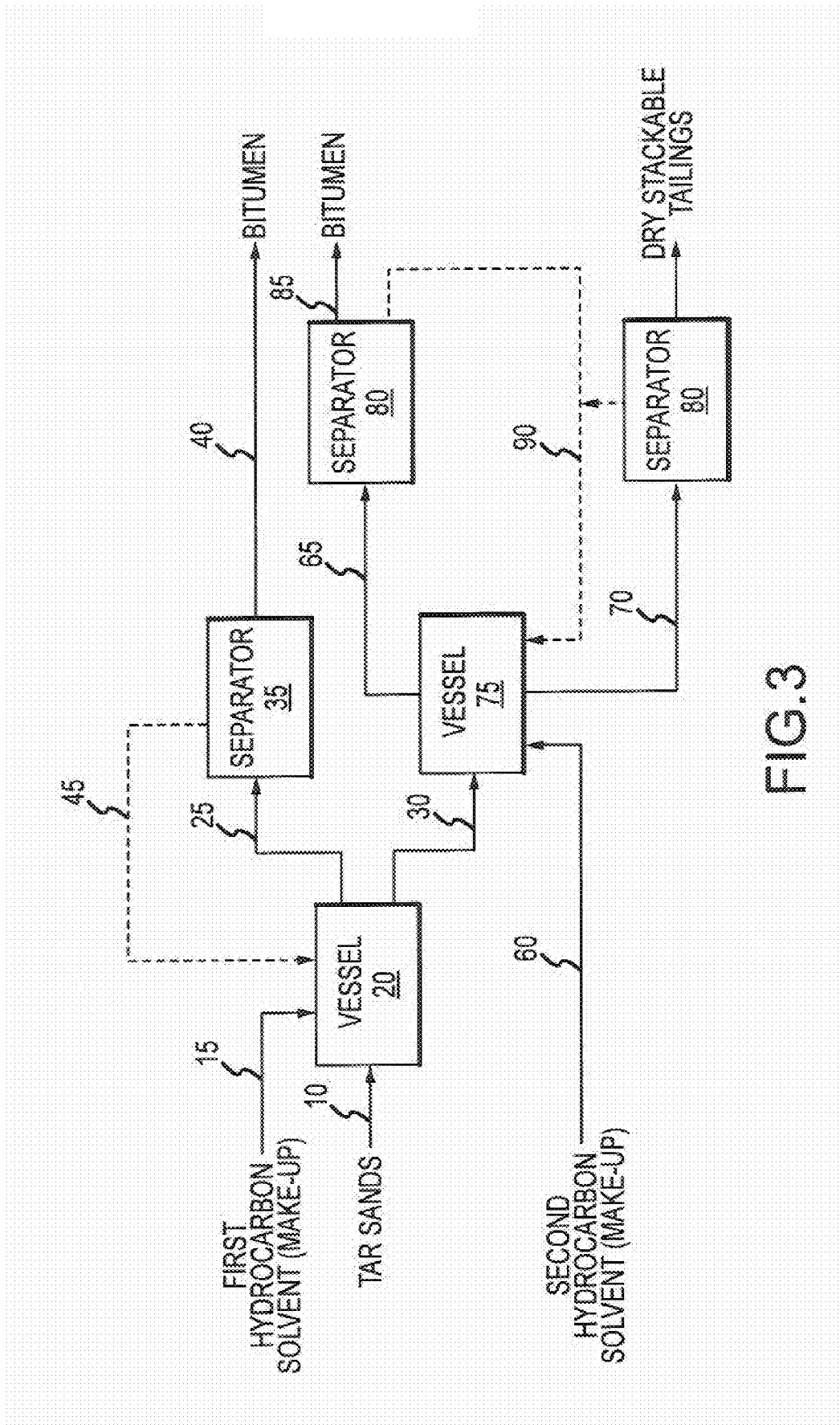
FIG. 3 is a schematic diagram representing embodiments of a process and apparatus for obtaining bitumen from tar sands including a separation step/device for removing additional solvent from the tailings.
Figure 4:
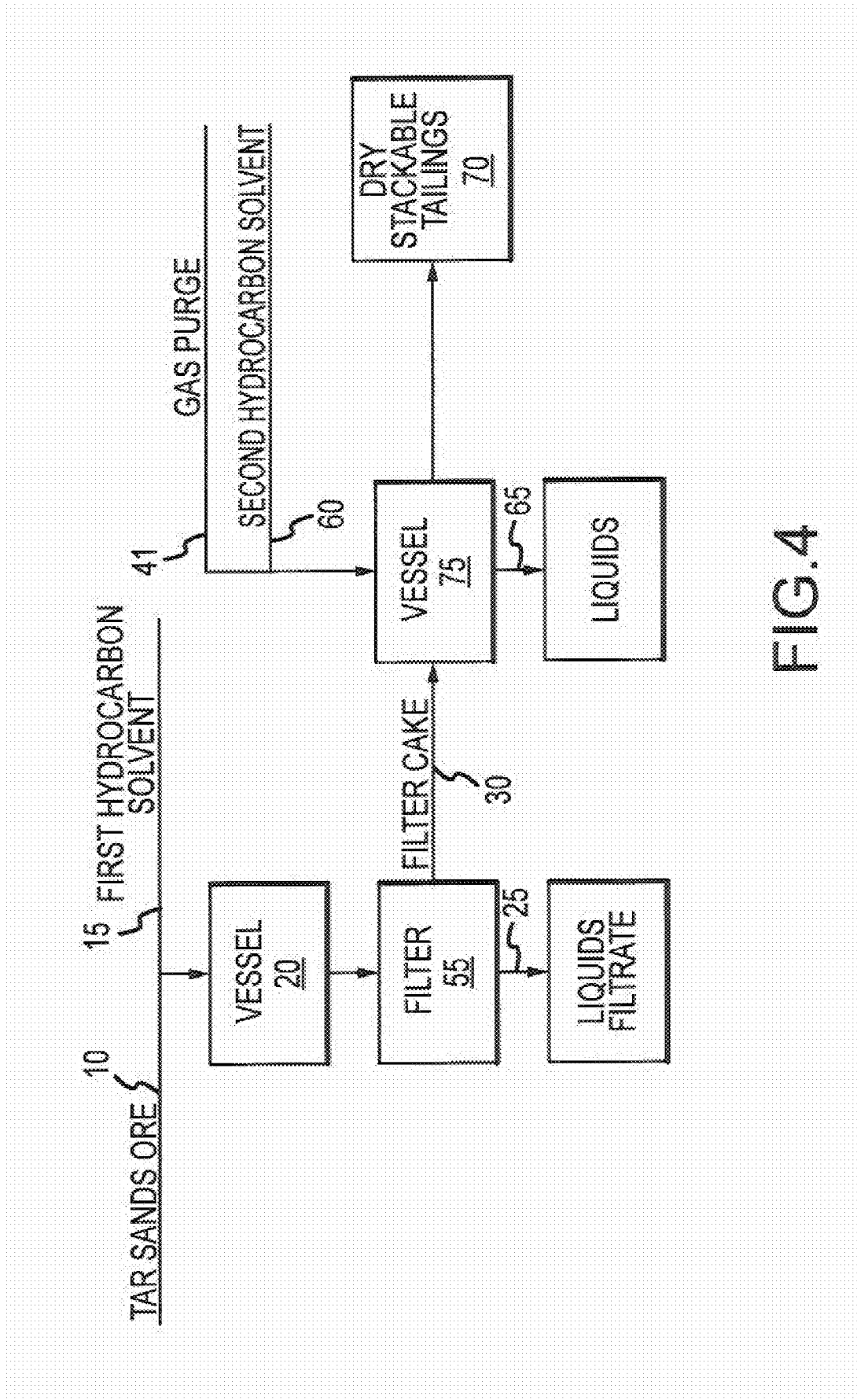
FIG. 4 is a schematic diagram representing embodiments of a process and apparatus for obtaining bitumen from tar sands.

With reference to FIG. 3, another embodiment of a method and system for separating bitumen from tar sands 10 is shown. This embodiment is also similar to that shown in FIG. 1, except that the tailings component 70 is subject to further hydrocarbon removal in a separator 95. The separator 95 may be a vacuum system that removes residual amounts of the second hydrocarbon solvent 60 to be sent to the recovered second hydrocarbon solvent 90. Also, the separator 95 may also be a screening operation that separates the larger "tar balls" from the remaining tailings. The tar balls may be recycled back with the incoming tar sands ore 10.

Another embodiment of a method and system for separation bitumen from tar sands 10 is shown. In this embodiment, the tar sand ore 10 and the first hydrocarbon solvent 15 are combined in the vessel 20 to form the first mixture. The first mixture is then filtered in a filter 55 to separate the first mixture into the first bitumen-enriched component 25 and the first bitumen-depleted component 30. It should be appreciated that the filter 55 may be a separate apparatus from the vessel 20 or may be integrated as part of the vessel 20. It should also be appreciated that the first bitumen-enriched component 25 may undergo further separation processes that are not shown in FIG. 4 to separate the bitumen from the first hydrocarbon solvent 15. Also, the first hydrocarbon solvent 15 may be recycled back to the process.

The first bitumen-depleted component 30 is routed to the vessel 75 where a gas 41 is blown through it to further separate the first hydrocarbon solvent 15 and the bitumen from the mineral solids. Any suitable gas may be used at this step in the process. After being purged with the gas 61, the first bitumen-depleted component 30 is then mixed with the second hydrocarbon solvent 60 form the second mixture. In one embodiment, this is done under pressure to maintain the second hydrocarbon solvent 60 in the liquid phase. The second mixture is then separated in any of the ways described in connection with the embodiments shown in FIGS. 1-3. The tailings component 70 is disposed of as dry stackable tailings and the liquids are further processed to recycle the second hydrocarbon solvent 60, separate the bitumen product, etc.

Figure 5:
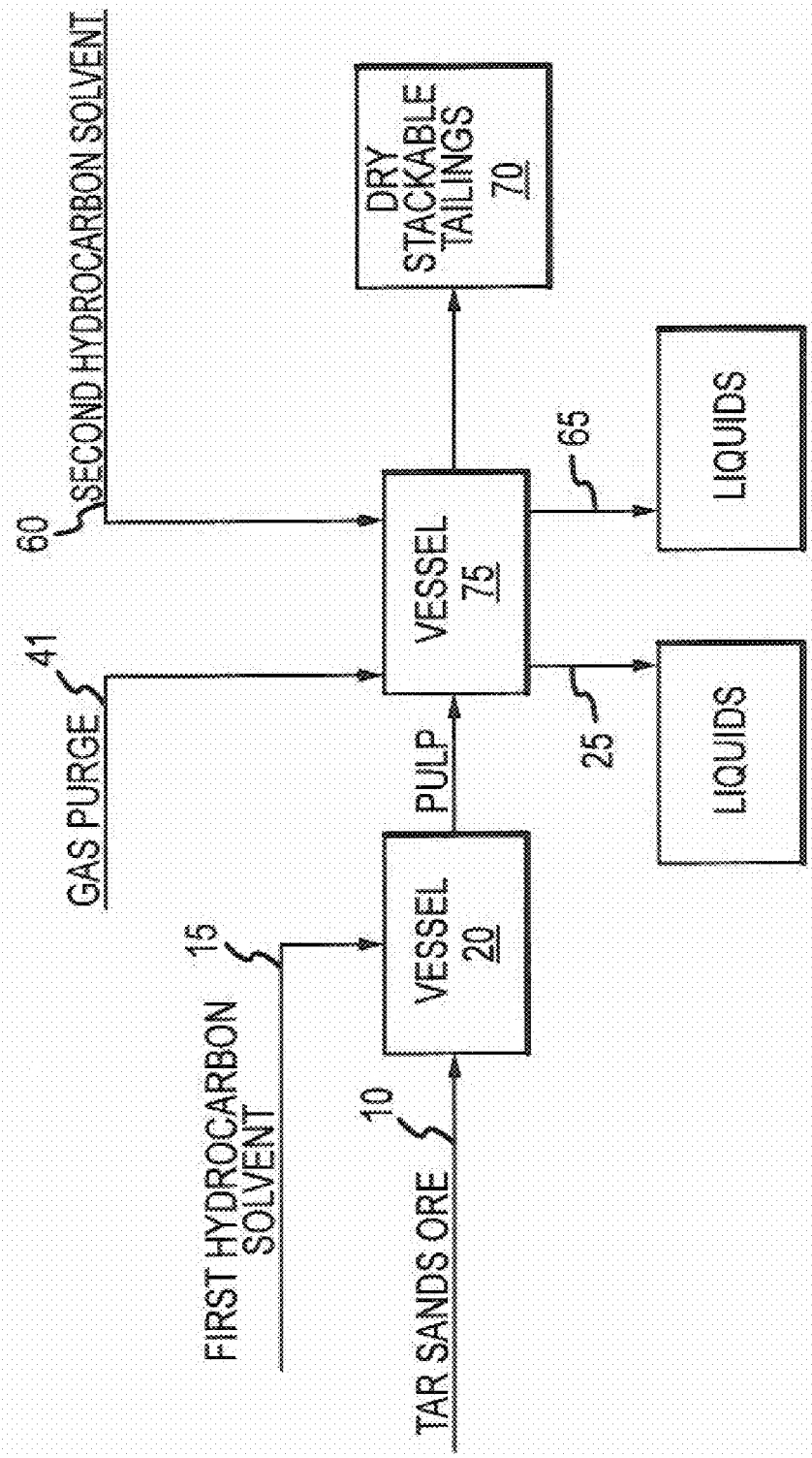
FIG. 5 is a schematic diagram representing embodiments of a process and apparatus for obtaining bitumen from tar sands that eliminates the filter shown in the embodiment of FIG. 4.

Another embodiment of a method of separating bitumen from tar sands 10 is shown in FIG. 5. This embodiment is similar to that shown in FIG. 4 except that in this embodiment, the first mixture is passed to the vessel 75 without undergoing any separation processes. The first mixture may be in the form of a pulp or slurry that is pumped or conveyed to the vessel 75. The vessel 75 may be a pipe, tank, plate and frame filter press, or other vessel that is capable of receiving the first mixture or the bitumen-depleted component 30 depending on the configuration.

Once in the vessel 75, the first mixture is subject to a gas purge 41 to separate the liquid hydrocarbons from the mineral solids. The liquid hydrocarbons exit the vessel 75 as the first bitumen-enriched component 25. The first bitumen-depleted component continues through the vessel 75 and is mixed with the second hydrocarbon solvent 60. This may be done under pressure to keep the second hydrocarbon solvent 60 in the liquid phase. The second mixture can then be processed in any of the ways described in connection with the previous embodiments to result in the tailings component 70 and bitumen product.

Figure 6:
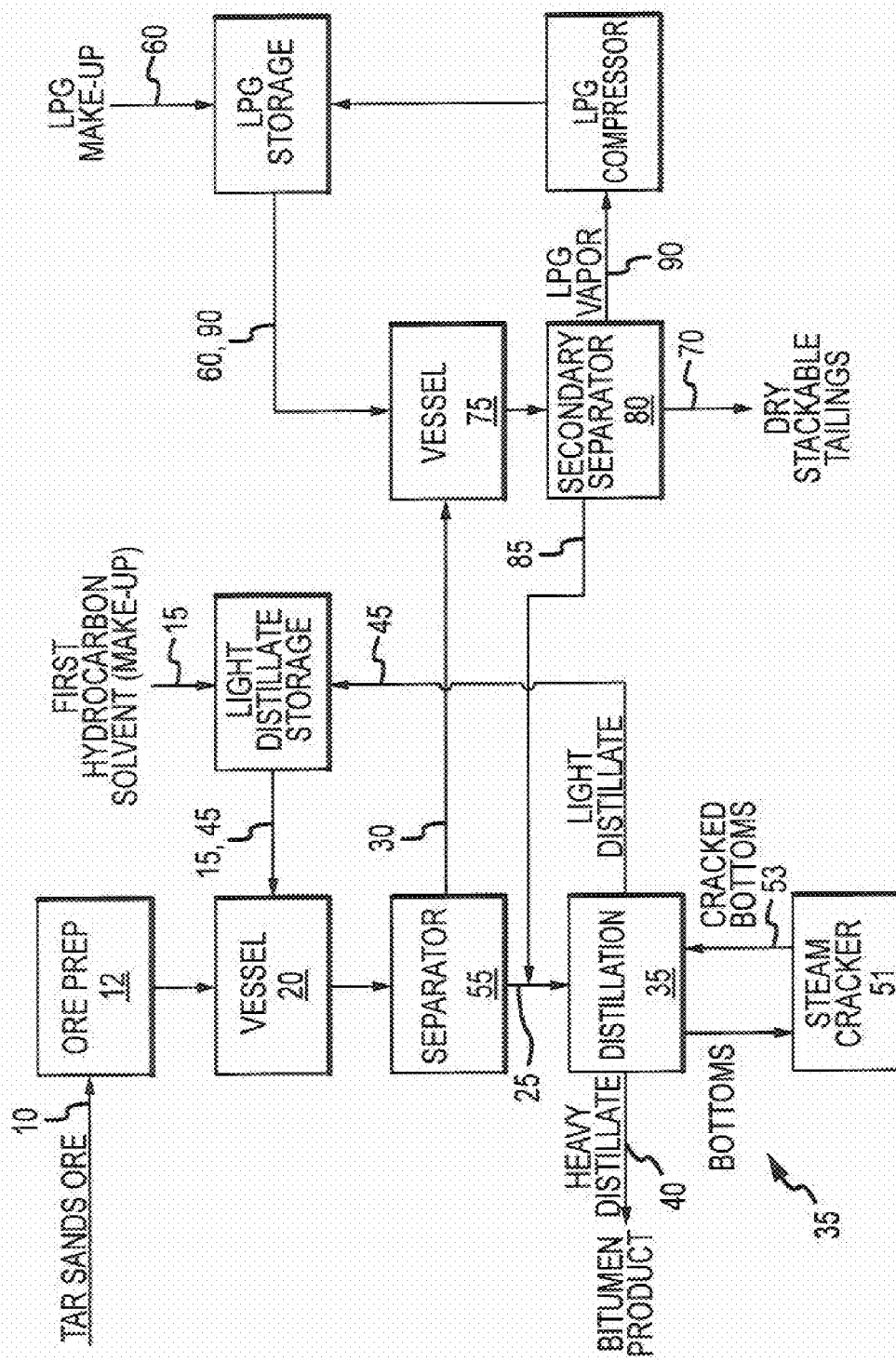
FIGS. 6 and 7 are schematic diagrams representing embodiments of an overall extraction process and apparatus for obtaining bitumen from tar sands.

Another embodiment of a method of separating bitumen from tar sands 10 is shown in FIG. 6. In this embodiment the tar sands 10 are stored in a hopper or vessel 12 prior to being loaded into the vessel 20. The tar sands 10 may be comminuted or otherwise manipulated in the hopper 12 to prepare it to be fed through the system. The tar sand ore 10 is mixed with the first hydrocarbon solvent 15, 45 in the vessel 20 to form the first mixture.

The first mixture is separated into a first bitumen-enriched component 25 and a first bitumen-depleted component 30. The first bitumen-enriched component 25 is sent to the separator 35, which in this embodiment is a distillation process. The distillation process results in a light distillate that is the first hydrocarbon solvent 45, a heavy distillate that is the bitumen product 40, and bottoms. In this embodiment, the bottoms may be cracked into lighter hydrocarbons in a steam cracker 51. The cracked bottoms 53 may be fed back to the separator 35.

The amount of make-up first hydrocarbon solvent 15 may be greatly reduced or even eliminated by cracking some of the heaviest hydrocarbons in the bitumen. This may make the process self-sufficient in terms of the first hydrocarbon solvent 15 so that it is unnecessary to transport solvent to the site to extract the bitumen.

It should be noted that there is a significant advantage to the process shown in FIG. 6 in comparison to the process shown in FIG. 3. The process shown in FIG. 3 tends to produce a very viscous bitumen product that often needs further processing on site or needs to be diluted with a solvent for transportation. The cost of the diluent is significant and it is a cost that is typically not paid for by the party that receives the bitumen product (e.g., upgrader or refiner). In contrast, the process of FIG. 6 eliminates the need to use any extra diluent, but the final bitumen product 40 is light enough to be transported without any additives.

The first bitumen-depleted component 30 is routed to the vessel 75 where it is processed in a manner similar to that described in connection with FIG. 1 with some differences. One difference is that the second hydrocarbon solvent 60 is depicted as being LPG. In addition, the second bitumen-enriched component 85 is combined with the first bitumen-enriched component 25 to further separate the first hydrocarbon solvent 15 from the bitumen product 40 with the separator 35.

With reference to FIG. 7, another embodiment of a method of separating bitumen from tar sands 10 is shown. This embodiment is similar in many ways to the embodiment shown in FIG. 6. However, this embodiment does not use the steam cracker 51 to crack the bottoms from the separator 35. Also, the second mixture is separated in the vessel 75 by reducing the pressure which produces: (a) a gaseous component of the second hydrocarbon solvent 90, (b) the second bitumen-enriched component 65 that includes liquid solvent 90, the first hydrocarbon solvent 15, and bitumen 40, and (c) the tailings component 70. The second bitumen-enriched component 65 is separated with separator 80 to isolate the remainder of the second hydrocarbon solvent 90. The bitumen component 85 includes some of the first hydrocarbon solvent 15 and is recycled to the separator 40 to isolate it into its various components.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

EXAMPLES

The following examples are provided to further illustrate the subject matter disclosed herein. These examples should not be considered as being limiting in any way.

In the following examples, bitumen was extracted from three different tar sands—Trinidad tar sands ("Trinidad"), high grade Athabasca tar sands ("AthHG"), and low grade Athabasca tar sands ("AthLG"). The composition of each tar sand is shown in Table 3 along with a brief description. The composition of each tar sands was determined using a Dean-Stark apparatus. Before being used in the examples, the tar sands were broken by hand into pieces small enough to fit through a 0.5 inch diameter hole.

The bitumen was extracted from the tar sands using a multi-stage extraction process that included two solvent extraction steps. The tar sands were initially mixed with a liquid solvent (the particular solvent is specified in the examples) at atmospheric pressure. The mixture was separated into a first bitumen-enriched component and a first bitumen-depleted component. The bitumen-depleted component was then combined with liquid LPG in a pipe. The pressure in the pipe was sufficient to keep the LPG in a liquid form. This combination was separated into a second bitumen-enriched component and a tailings component.

TABLE 3

| | | Tar sands | |
|---|---|---|---|
| Sample | Bitumen (wt %) | Water (wt %) | Description |
| Trinidad | 12 | 4.6 | A blend of drill core samples obtained from tar sands in Trinidad. |
| AthHG | 12 | 4 | A high grade tar sands from the Athabasca Tar sands in Alberta, Canada. |
| AthLG | 8 | 5.5 | A low grade tar sands from the Athabasca Tar sands in Alberta, Canada. |

Example 1

Trinidad Tar Sands

In this example, Bitumen was extracted from a total of eleven samples of Trinidad tar sands. The samples are designated T-1 through T-11 in Table 4. The details of the extraction of each sample can be found in Table 4 along with some observations taken during each process.

Except as noted otherwise, each sample was processed using the following procedure. Each sample was initially weighed and the sample was placed into a mixing container along with the necessary amount of the first solvent to achieve the proper solvent to bitumen ratio specified in Table 4. The first solvent and the tar sands were mixed with a standard three blade impeller. The tar sands were leached for one hour in the mixing container. The mixture was then filtered with a Buchner funnel, either under vacuum or under atmospheric pressure, to separate the liquids from the solids. The filtrate of liquids formed a first bitumen-enriched component and the filter cake of solids formed a first bitumen-depleted component. The filtrate was weighed and measured. The filter cake was subjected to a second solvent extraction to remove any remnants of the first solvent in the filter cake and to extract additional bitumen from the filter cake. The amount of the first solvent still present in the filter cake varied depending on the filtration time and the particular solvent used.

The second solvent extraction was performed by placing the filter cake into a pipe extractor and introducing liquid LPG into the pipe extractor (commercial LPG was used). The liquid LPG solvated additional bitumen and any remaining amounts of the first solvent from the filter cake. The filter cake was soaked in the liquid LPG for fifteen minutes. The liquids and solids in the mixture were separated into a second bitumen-enriched component and a tailings component, respectively. The second bitumen-enriched component included the liquid LPG, bitumen, and any remaining amounts of the first solvent. The LPG was removed by allowing it to vaporize within the system. The bitumen and the first solvent (both in the form of a liquid) were then captured in a flask. The weight and amount of the liquids was measured. The remaining solids in the pipe were also removed and weighed.

Some of the samples were extracted using the same procedure described above with some subtle differences. Sample T-3 was mixed with the first solvent in the mixing pipe followed directly by the LPG soaking. Samples T-6 and T-7 were the same except that the filter cake from T-6 was completely dry when placed in the pipe extractor and the filter cake from T-7 was still wet when placed in the pipe. Sample T-9 was extracted using a three step process that included initially extracting bitumen with liquid LPG in the pipe, separating the liquids and the solids, leaching the solids with the first solvent in the mixing container, separating the liquids and the solids, and extracting the bitumen and any remaining amounts of the first solvent in the pipe extractor with LPG.

The results of the extraction process are shown in Table 5. The total weight loss is the difference between the weight of the tar sands feedstock and the weight of the tar sands component removed from the pipe extractor. The American Petroleum Institute (API) gravity was determined for the liquid extracted from the pipe extractor. The tailings component removed from the pipe extractor was analyzed using the Dean-Stark apparatus to determine the amount of bitumen in the residual tar sands.

The amount of bitumen in the feedstock can be calculated using this equation: bitumen in feedstock (wt %)=total weight loss (wt %)−water in feedstock (wt %)+(100−total weight loss (wt %))*fraction of bitumen in residual tar sands. Using sample T-1 as an example, the calculation was as follows: Bitumen in feedstock (wt %)=18.13−4.6+(100−18.13)*0.0205. The percent of the bitumen that was extracted can then be calculated using this equation: (bitumen in feedstock (wt %)−(100−total weight loss (wt %))*fraction of bitumen in residual tar sands)/bitumen in feedstock (wt %). Using sample T-1 as an example, the calculation was as follows: (15.20−(100−18.13)*0.0205)/15.20.

TABLE 4

Trinidad Extraction Process Parameters

| Sample | First Solvent | Ratio | Description First Extraction | Second Extraction |
|---|---|---|---|---|
| T-1 | Biodiesel | 14:1 | 1 hour filtration | |
| T-2 | Toluene | 5:1 | 4-5 hour filtration | Filter cake solids compacted in pipe |
| T-3 | Toluene | 20:1 | | Toluene flow slow out of pipe, very compact cake |
| T-4 | Xylene | 10:1 | Filtered overnight | Solids poured out easily |
| T-5 | Toluene | 10:1 | 3-5 minute filtration | No liquid from pipe |
| T-6 | Light Distillate* | 10:1 | 3-5 minute filtration, dry filter cake | Sands easily removed, high viscosity liquid recovered |
| T-7 | Light Distillate | 10:1 | 20 minute filtration, wet filter cake | Sands easily removed low viscosity liquid recovered |
| T-8 | Light Distillate | 5:1 | 3-5 minute filtration, wet filter cake | Sands removed as one big clump, low viscosity liquid recovered |
| T-9 | Light Distillate | 10:1 | First extraction: LPG resulted in compacted cake Second extraction: filtered first solvent for one hour Third extraction: sands removed easily, low viscosity liquid | |
| T-10 | Naphtha | 10:1 | 3-5 minute filtration, dry filter cake | Solids removed very easily |
| T-11 | Naphtha | 5:1 | 3-5 minute filtration, dry filter cake | Solids removed very easily |

*Light distillate solvent used in this example and the other examples has an API gravity of approximately 30. The light distillate includes highly aromatic compounds such as toluene, xylene, some benzene, and other ring compounds. the light distillate was obtained by steam cracking bitumen as described in U.S. Patent Application Publication No. 2006/0144760.

TABLE 5

Trinidad Extraction Results

| Sample | Weight Loss (%) | API Gravity of Extracted Liquid | Bitumen in Residual Tar Sands (wt %) | Bitumen in Feedstock (wt %) | Total Bitumen Extracted (wt %) |
|---|---|---|---|---|---|
| T-1 | 18.13 | 21.0 | 2.1 | 15.2 | 88.9 |
| T-2 | 17.59 | — | — | — | — |
| T-3 | 18.13 | 23.1 | — | — | — |

TABLE 5-continued

Trinidad Extraction Results

| Sample | Weight Loss (%) | API Gravity of Extracted Liquid | Bitumen in Residual Tar Sands (wt %) | Bitumen in Feedstock (wt %) | Total Bitumen Extracted (wt %) |
|---|---|---|---|---|---|
| T-4 | 17.45 | — | — | — | — |
| T-5 | 17.98 | — | — | — | — |
| T-6 | 14.14 | 9.2 | 2.6 | 11.7 | 81.3 |
| T-7 | 14.70 | 9.8 | 3.3 | 12.9 | 78.3 |
| T-8 | 15.25 | 21.5 | 3.3 | 13.4 | 79.2 |
| T-9 | 18.39 | 28.5 | 4.8 | 17.7 | 78.0 |
| T-10 | 14.71 | — | — | — | — |
| T-11 | 17.19 | — | 1.7 | 13.9 | 90.2 |

Example 2

AthHG Tar Sands

In this example, Bitumen was extracted from a total of four samples of high grade Athabasca tar sands. The samples are designated AHG-1 through AHG-4 in Table 6. The details of the extraction of each sample can be found in Table 6 along with some observations taken during each process.

The same general procedure outlined in Example 1 was used to extract bitumen from the high grade Athabasca tar sands samples with a few minor exceptions. Some of the samples were mixed with a bowtie shaped coil impeller instead of the three blade impeller. The coil impeller was used to ensure adequate mixing and dispersion of the large pieces of clay in the samples. The samples mixed with the coil impeller are noted in Table 6.

In general, it was more difficult to quickly and efficiently filter the high grade Athabasca tar sands than the Trinidad tar sands. For example, Sample AHG-1 did filter, but it was left overnight and there was no loose liquid remaining with the filter cake by morning. Also, Sample AHG-2 used the coil impeller which helped it to filter steadily but it was still somewhat slow. Sample AHG-4 was similar to Samples AHG-1 and AHG-3 except there was no loose liquid with the filter cake when it was placed in the pipe extractor. The results of the extraction process are shown in Table 7. It should be noted that Table 7 also shows the API gravity of the liquid filtrate resulting from the first extraction process.

TABLE 6

AthHG Extraction Process Parameters

| Sample | First Solvent | Ratio | Description First Extraction | Second Extraction |
|---|---|---|---|---|
| AHG-1 | Light Distillate | 5:1 | Filtered overnight, moist filter cake | Solids removed easily |
| AHG-2 | Biodiesel | 5:1 | Mixed with coil impeller, two hour atm filter* | Solids were slightly packed |
| AHG-3 | Light Distillate | 5:1 | Mixed with coil impeller, atm filtered overnight*, very moist filter cake | Liquid removed during N2 purge |
| AHG-4 | Light Distillate | 5:1 | Filters slow | Solids were quite dark |

*Filtered using Buchner filter with paper at atmospheric pressure (i.e., no vacuum).

TABLE 7

AthHG Extraction Results

| Sample | Weight Loss (%) | API Gravity of Filtrate | API Gravity of Extracted Liquid | Bitumen in Residual Tar Sands (wt %) | Bitumen in Feedstock (wt %) | Total Bitumen Extracted (wt %) |
|---|---|---|---|---|---|---|
| AHG-1 | 17.3 | 28.4 | 39.5 | 1.9 | 16.7 | 90.7 |
| AHG-2 | 19.6 | 28.5 | 29.6 | 1.7 | 17.0 | 91.7 |
| AHG-3 | 16.9 | 29.8 | 26.5 | 2.3 | 14.9 | 87.1 |
| AHG-4 | 17.0 | 31.5 | 29.9 | 2.4 | 14.9 | 86.7 |

Example 3

AthLG Tar Sands

In this example, Bitumen was extracted from a total of four samples of low grade Athabasca tar sands. The samples are designated ALG-1 through ALG-8 in Table 8. The details of the extraction of each sample can be found in Table 8 along with some observations taken during each process.

The same general procedure outlined in Example 1 was used to extract bitumen from the low grade Athabasca tar sands samples with a few minor exceptions. Sample ALG-4 did not undergo the first extraction process and instead was put directly into the pipe extractor. No liquid was recovered from the second extraction process (LPG extraction process) for Sample ALG-2. Sample ALG-3 used biodiesel as the first solvent and was able to filter fast. A coil impeller was used to mix the first solvent and the tar sands. The mixture was subjected to a thirty minute vacuum filtration and thirty minute atmospheric filtration. The filter cake was allowed to air dry under room temperature overnight before entering the pipe extractor. The solids were removed from the pipe extractor quite easily. The low grade Athabasca tar sands was easily processed though the system. The results of the extraction process are shown in Table 9.

Example 4

Modified Process

In this example, Bitumen was extracted from the high grade and low grade Athabasca tar sands using a new process that eliminates the filtration step after the first solvent extraction. The samples are designated MALG-1 through MAHG-8 in Table 10. The details of the extraction of each sample can be found in Table 10 along with some observations taken during each process.

Each sample was mixed with the first solvent (i.e., Naphtha) for one hour. The entire contents of the mixing container was then poured into the pipe extractor. Gaseous LPG was introduced into the pipe to remove any free liquid. The remaining solids were then washed with liquid LPG in the same manner explained in previous Examples. The solids were removed and allowed to dry to ensure all the LPG had evaporated. The results of the extraction process are shown in Table 11. The initial weight loss shown in Table 11 corresponds to the weight of the solids from the pipe extractor immediately after being removed from the pipe extractor. The final weight loss is after the solids were allowed to dry at 40° C. for period greater than eight hours.

TABLE 8

AthLG Extraction Process Parameters

| Sample | First Solvent | Ratio | Description First Extraction | Second Extraction |
|---|---|---|---|---|
| ALG-1 | Light Distillate | 6:1 | Filters very fast | Solids removed easily, light liquid |
| ALG-2 | Naphtha | 6:1 | Filtered instantly | Solids removed easily, no liquid capture |
| ALG-3 | Biodiesel | 6:1 | Filtered fast | Few chunks of dark solids |
| ALG-4 | — | 20:1 | — | Solids were tightly packed in the pipe, minimal liquid recovered |
| ALG-5 | Light Distillate | 5:1 | Filtered instantly, heavy filter cake | Solids removed easily |
| ALG-6 | Light Distillate | 5:1 | Filtered instantly, heavy filter cake | Solids removed easily |
| ALG-7 | Light Distillate | 5:1 | Dry feed, filtered for 2 days but still moist, very compact dark filter cake | Lots of liquid recovered |
| ALG-8 | Light Distillate | 5:1 | Filtered fast | Solids were very dry, no large clumps of asphaltenes, few pellets of clay |

TABLE 9

AthLG Extraction Results

| Sample | Weight Loss (%) | API Gravity of Filtrate | API Gravity of Extracted Liquid | Bitumen in Residual Tar Sands (wt %) | Bitumen in Feedstock (wt %) | Total Bitumen Extracted (wt %) |
|---|---|---|---|---|---|---|
| ALG-1 | 13.7 | 31.6 | 42.1 | 1.4 | 8.4 | 85.9 |
| ALG-2 | 15.2 | 54.5 | — | — | — | — |
| ALG-3 | 16.5 | 48.1 | 13.9 | — | — | — |
| ALG-4 | 10.8 | — | 13.9 | 8.0 | 11.4 | 37.8 |
| ALG-5 | 11.0 | 32.1 | 38.3 | 3.2 | 7.4 | 61.3 |
| ALG-6 | 13.1 | 29.2 | 29.1 | 2.7 | 8.9 | 73.9 |
| ALG-7 | 6.2 | 27.4 | 26.9 | 6.0 | 11.2 | 49.8 |
| ALG-8 | 10.0 | 27.8 | 31.5 | 2.1 | 69.3 | 64.2 |

TABLE 10

Modified Process Extraction Process Parameters

| Sample | First Solvent | Ratio | Description |
|---|---|---|---|
| MALG-1 | Naphtha | 5:1 | Nitrogen press 40 psi, solids very packed but clean |
| MALG-2 | Naphtha | 5:1 | Nitrogen press 40 psi, solids slightly packed but clean |
| MAHG-3 | Naphtha | 5:1 | Nitrogen press 40 psi, solids removed easily |
| MAHG-4 | Naphtha | 5:1 | Nitrogen press 40 psi, solids removed easily |
| MALG-5 | Naphtha | 5:1 | LPG press 120 psi, solids very packed |
| MAHG-6 | Naphtha | 5:1 | LPG press 140 psi, solids slightly packed |
| MAHG-7 | Naphtha | 2.5:1 | LPG press 120 psi, thin hard crust on top of solids, loose solids below crust were easily removed but look dark |
| MAHG-8 | Naphtha | 2.5:1 | LPG press 150 psi, solids removed very easily and looks clean |

TABLE 11

Modified Process Extraction Results

| Sample | Initial Weight Loss (wt %) | Final Weight Loss (wt %) | Bitumen in Residual Tar Sands (wt %) | Bitumen in Feedstock (wt %) | Total Bitumen Extracted (wt %) |
|---|---|---|---|---|---|
| MALG-1 | 7.00 | 15.00 | 0.89 | 9.26 | 91.81 |
| MALG-2 | 7.00 | 14.50 | 1.23 | 9.05 | 88.35 |
| MAHG-3 | 12.00 | 15.50 | 0.90 | 12.26 | 93.81 |
| MAHG-4 | 14.50 | 16.25 | 1.34 | 13.37 | 91.62 |
| MALG-5 | 9.50 | 16.25 | 0.91 | 10.51 | 92.77 |
| MAHG-6 | 14.50 | 15.50 | 0.86 | 12.23 | 94.05 |
| MAHG-7 | 13.75 | 15.25 | 1.59 | 12.60 | 89.31 |
| MAHG-8 | 15.19 | 15.95 | 1.12 | 12.64 | 92.54 |
| MALG-9 | 3.8 | 13.6 | 1.3 | 8.2 | 85.9 |
| MALG-10 | 4.0 | 15.0 | 1.0 | 9.3 | 91.0 |
| MALG-11 | 4.8 | 15.0 | 0.02 | 8.5 | 99.8 |
| MAHG-12 | 3.5 | 16.8 | 2.3 | 12.2 | 84.1 |
| MALG-13 | 5.8 | 14.8 | 1.7 | 9.7 | 85.2 |
| MAHG-14 | 15.0 | 16.0 | 0.4 | 12.4 | 97.0 |
| MAHG-15 | 16.3 | 17.3 | 0.8 | 13.9 | 95.3 |
| MAHG-16 | 16.0 | 18.0 | 0.9 | 14.7 | 95.2 |
| MAHG-17 | 17.0 | 18.5 | 1.0 | 15.4 | 94.5 |

Example Conclusions

The results of the various extraction examples above demonstrate that the system and method for separating bitumen from tar sands is efficient and effective. The residual tar sands or tails from all the processes, no matter which solvent or feed is used, were all relatively low in bitumen content. Analysis of the residual tar sands with the Dean-Starks apparatus reveals that the bitumen content can be as low as 0.89% and as high as 6.55% depending on the process parameters (e.g., choice of solvents, vacuum or atmospheric filtration, and the like). The residual tar sands is dry and free of the sticky bitumen and varies in color from light brown to dark brown depending on which solvent is chosen as the first solvent.

The processes and system can be used to extract at least approximately 90 wt % of the bitumen in the feedstock, or, desirably, at least approximately 95 wt % of the bitumen in the feedstock. This applies to the Trinidad tar sands as well as the high grade and low grade Athabasca tar sands. The tails of the high grade Athabasca tar sands seem to be much darker in color than the low grade Athabasca tar sands. It may desirable to perform a secondary washing of these tails to achieve the clean looking tails observed from the low grade Athabasca tar sands. Alternatively, the change in color may be due to a different mineralogy of the tails from the high grade and low grade samples. The results show that at least approximately 80 wt % of the bitumen, or, desirably, at least approximately 85 wt % of the bitumen in the low grade Athabasca tar sands can be recovered.

The modified process and system that eliminated the filtration step produced significant positive results. The data was consistent in showing a total process weight loss of approximately 15 to 16 wt % from low grade Athabasca tar sands having approximately 9 wt,% bitumen and high grade Athabasca tar sands having approximately 12 wt % bitumen. The bitumen recovery was at or above 90 wt % and this includes using the lower solvent to bitumen ratio of 2.5:1.

Commercially available LPG was used in the examples for the second hydrocarbon solvent and provided superior results in comparison to conventional technologies. However, it is also contemplated that the second hydrocarbon solvent may be entirely or at least substantially comprised of propane and/or propylene.

ILLUSTRATIVE EMBODIMENTS

Reference is made in the following to a number of illustrative embodiments of the subject matter described herein. The following embodiments illustrate only a few selected embodiments that may include the various features, characteristics, and advantages of the subject matter as presently described. Accordingly, the following embodiments should not be considered as being comprehensive of all of the possible embodiments.

Also, features and characteristics of one embodiment may and should be interpreted to equally apply to other embodiments or be used in combination with any number of other features from the various embodiments to provide further additional embodiments, which may describe subject matter having a scope that varies (e.g., broader, etc.) from the particular embodiments explained below. Accordingly, any combination of any of the subject matter described herein is contemplated.

According to one embodiment, a method for obtaining bitumen comprises: mixing tar sands with a minimum amount of a first hydrocarbon solvent to form a first mixture; and mixing the first mixture with liquid LPG to form a second mixture. The method may comprise separating the first mixture into a first bitumen-enriched component and a bitumen-depleted component, wherein mixing the first mixture with the liquid LPG includes mixing the bitumen-depleted component with the liquid LPG to form the second mixture. Separating the first mixture into the first bitumen-enriched component and the bitumen-depleted component may include filtering the first mixture.

The first mixture may be filtered under a vacuum. The method may comprise separating the second mixture into a second bitumen-enriched component and a tailings component.

The method may comprise mixing gaseous LPG with the first mixture to separate the first solvent from the first mixture in a gas-pressure filtration step. The first mixture may be mixed with the liquid LPG at a pressure that is greater than approximately 1.1. atmospheres. The first hydrocarbon solvent may be a light aromatic solvent. The light aromatic solvent may comprise toluene, xylene, biodiesel, light distillate, and/or naphtha. The first hydrocarbon solvent may have a boiling temperature of approximately 50° C. to 375° C. The liquid LPG may include propane and/or butane. The liquid LPG may have a boiling temperature of approximately −80° C. to 10° C. The tar sands may include approximately 3 wt % to 20 wt % of bitumen. At least approximately 80 wt % of the bitumen from the tar sands may be extracted using the method.

According to another embodiment, a method comprises mixing tar sands with liquid LPG to separate bitumen from the tar sands. The method may comprise separating bitumen from the tar sands in a leaching process prior to mixing the tar sands with the liquid LPG. The leaching process may include mixing the tar sands with a first hydrocarbon solvent. The method may comprise mixing the tar sands with gaseous LPG to separate the first hydrocarbon solvent from the tar sands prior to the tar sands being mixed with the liquid LPG. The method may comprise separating a bitumen-enriched component from a bitumen-depleted component. The method may comprise evaporating the liquid LPG to separate the liquid LPG from the bitumen.

According to another embodiment, a method comprises mixing tar sands with liquid propane and/or liquid butane to separate bitumen from the tar sands. The method may comprise separating bitumen from the tar sands in a leaching process prior to mixing the tar sands with the liquid propane and/or liquid butane. The leaching process may include mixing the tar sands with a first hydrocarbon solvent. The method may comprise mixing the tar sands with gaseous propane and/or gaseous butane to separate the first hydrocarbon solvent from the tar sands prior to the tar sands being mixed with the liquid propane and/or liquid butane.

According to another embodiment, a method comprises mixing tar sands with a liquid hydrocarbon material which has a boiling point of no more than 10° C. The liquid hydrocarbon material may include propane and/or butane. The liquid hydrocarbon material may include LPG. The tar sands and the liquid hydrocarbon material may form a first mixture and the method may comprise separating the first mixture into a bitumen-enriched component and a bitumen-depleted component.

According to another embodiment, a method comprises mixing tar sands with a hydrocarbon solvent at an elevated pressure necessary to maintain the hydrocarbon solvent in liquid form. The hydrocarbon solvent may include propane and/or butane. The hydrocarbon solvent may include LPG. The tar sands and the hydrocarbon solvent may form a first mixture and the method may comprise separating the first mixture into a bitumen-enriched component and a bitumen-depleted component.

According to another embodiment, a method for obtaining bitumen, comprises: mixing a material comprising bitumen with a first hydrocarbon solvent to form a first mixture; separating the first mixture into a first bitumen-enriched component and a first bitumen-depleted component; mixing the first bitumen-depleted component with a second hydrocarbon solvent to form a second mixture; and separating the second mixture into a second bitumen-enriched component and a tailings component. The material comprising bitumen may be tar sands. Mixing the material comprising bitumen with the first hydrocarbon solvent may comprise mixing the material comprising bitumen with the first hydrocarbon solvent in a countercurrent process.

Separating the first mixture into the first bitumen-enriched component and the first bitumen-depleted component may comprise settling the first bitumen-depleted component. Separating the first mixture into the first bitumen-enriched component and the first bitumen-depleted component may comprise filtering the first bitumen-depleted component. Separating the first mixture into the first bitumen-enriched component and the first bitumen-depleted component may comprise separating the first bitumen-depleted component by gravity drainage.

Mixing the first bitumen-depleted component with the second hydrocarbon solvent may comprise mixing the first bitumen-depleted component with the second hydrocarbon solvent in a countercurrent process. Mixing the first bitumen-depleted component with the second hydrocarbon solvent may comprise mixing the first bitumen-depleted component with the second hydrocarbon solvent in a batch process. Mixing the first bitumen-depleted component with the second hydrocarbon solvent may comprise mixing the first bitumen-depleted component with the second hydrocarbon solvent at a pressure sufficient to maintain the second hydrocarbon solvent in liquid form. Mixing the first bitumen-depleted component with the second hydrocarbon solvent may comprise mixing the first bitumen-depleted component with the second hydrocarbon solvent at a pressure between about 20 kPa and about 1500 kPa. Separating the second mixture into the second bitumen-enriched component and the tailings component may comprise separating the second mixture in a batch process.

The first hydrocarbon solvent may comprise a light aromatic solvent. The first hydrocarbon solvent may also comprise toluene, xylene, kerosene, diesel (including biodiesel), gas oil, light distillate, naphtha, a commercial aromatic solvent such as Aromatic 100, 150, or 200 (known as Solvesso 100, 150, and 200 outside the U.S.A.) or a combination or derivative thereof. The first hydrocarbon solvent may comprise naphtha. The first hydrocarbon solvent may comprise gas oil. The first hydrocarbon solvent may comprise benzene, toluene, an aromatic alcohol or a combinations or derivative thereof. The first hydrocarbon solvent may have a boiling point of approximately 75° C. to 375° C. The second hydrocarbon solvent may comprises a cyclo- or iso-paraffin having between 3 and 9 carbons or a combination or derivative thereof. The second hydrocarbon solvent may comprise propane or butane.

The second hydrocarbon solvent may have a boiling point of approximately −20° C. to 150° C. The material comprising bitumen may have a bitumen concentration of approximately 3 wt % to 20 wt % prior to mixing with the first hydrocarbon solvent and the first bitumen-depleted component may have a bitumen concentration of approximately 0.5 wt % to 5 wt % prior to mixing with the second hydrocarbon solvent. The material comprising bitumen may have a bitumen concentration of approximately 3 wt % to 20 wt % prior to mixing with the first hydrocarbon solvent and the tailings component may have a bitumen concentration of approximately 0.01 wt % to 2 wt %.

The method may comprise transporting the material comprising bitumen and the first hydrocarbon solvent through a pipeline or mixing the material comprising bitumen and the first hydrocarbon solvent in a pipeline. The method may comprise removing a portion of the second hydrocarbon solvent or a portion of the first hydrocarbon solvent from the tailings component after separating the second mixture into the second bitumen-enriched component and the tailings component. The method may comprise separating the first bitumen-enriched component into a bitumen product and a recovered first hydrocarbon solvent. The material comprising bitumen may be a first quantity of material comprising bitumen and the method may further comprise mixing a second quantity of material comprising bitumen with the recovered first hydrocarbon solvent.

Separating the first bitumen-enriched component into the bitumen product and the recovered first hydrocarbon solvent may comprise heating the first bitumen-enriched component to a temperature greater than or equal to the approximate boiling point of the first hydrocarbon solvent. Separating the first bitumen-enriched component into the bitumen product and the recovered first hydrocarbon solvent may comprise heating the first bitumen-enriched component to a temperature of approximately 70° C. to 170° C.

The method may comprise separating the second bitumen-enriched component into a bitumen product and a recovered second hydrocarbon solvent. The first bitumen-depleted component may be a first quantity of first bitumen-depleted component and the method may further comprise mixing a second quantity of first bitumen-depleted component with the recovered second hydrocarbon solvent. Separating the second bitumen-enriched component into the bitumen product and the recovered second hydrocarbon solvent may comprise reducing the pressure of the second bitumen-enriched component.

According to another embodiment, a method for obtaining bitumen comprises: providing a material comprising bitumen; and performing at least two organic fluid extractions on the material serially. The material comprising bitumen may be tar sands. Performing at least two organic fluid extractions serially comprises performing a first organic fluid extraction using a first hydrocarbon solvent and performing a second organic fluid extraction using a second hydrocarbon solvent.

According to another embodiment, a method for obtaining bitumen comprises: mixing a first quantity of tar sands with a first hydrocarbon solvent to form a first mixture; separating the first mixture into a first bitumen-enriched component and a first quantity of first bitumen-depleted component; separating the first bitumen-enriched component into a first bitumen product and a recovered first hydrocarbon solvent; mixing the recovered first hydrocarbon solvent with a second quantity of tar sands; mixing the first quantity of the first bitumen-depleted component with a second hydrocarbon solvent to form a second mixture; separating the second mixture into a second bitumen-enriched component and a tailings component; separating the second bitumen-enriched component into a second bitumen product and a recovered second hydrocarbon solvent; and mixing the recovered second hydrocarbon solvent with a second quantity of first bitumen-depleted component.

According to another embodiment, a system for obtaining bitumen comprises: a first separator for separating a first mixture comprising tar sands and a first hydrocarbon solvent into a first bitumen-enriched component and a first bitumen-depleted component; a second separator for separating the first bitumen-enriched component into a first bitumen product and a recovered first hydrocarbon solvent; a third separator for separating a second mixture comprising a tailings component and a second hydrocarbon solvent into a second bitumen-enriched component and a tailings component; and a fourth separator for separating the second bitumen-enriched component into a second bitumen product and a recovered second hydrocarbon solvent. The system may include a pipeline for routing the recovered first hydrocarbon solvent into the first separator. The system may comprise a pipeline for routing the recovered second hydrocarbon solvent into the third separator. The system may comprise a filter for filtering the first bitumen-depleted component. The first separator may comprise a settling vessel. The second separator may comprise a multi-hearth solvent recovery furnace. The third separator may comprise an autoclave. The fourth separator may comprises an expansion vessel.

As used herein, spatial or directional terms, such as "left," "right," "front," "back," and the like, relate to the subject matter as it is shown in the drawing Figures However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc., used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

In addition, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g. 5.5 to 10, 2.34 to 3.56, and so forth) or any values from 1 to 10 (e.g., 3, 5.8, 9.9994, and so forth).

What is claimed is:

1. A method for obtaining bitumen comprising:
   mixing tar sands with a first hydrocarbon solvent, forming a first mixture;
   separating the first mixture into a bitumen-enriched component and a bitumen-depleted component;
   mixing the bitumen-depleted component with liquid LPG, forming a second mixture; and
   separating the second mixture into a second bitumen-enriched component and a tailings component.

2. The method of claim 1 wherein separating the first mixture into the bitumen-enriched component and the bitumen-depleted component includes filtering the first mixture.

3. The method of claim 2 wherein the first mixture is filtered under a vacuum or under pressure.

4. The method of claim 1 comprising screening the tailings component to separate additional bitumen from the tailings component, and adding the additional bitumen to the first mixture.

5. The method of claim 1 comprising blowing a gas through the first mixture to separate the bitumen-depleted component from the first mixture.

6. The method of claim 1 wherein the bitumen-depleted component is mixed with the liquid LPG at a pressure that is greater than approximately 1.1 atmospheres.

7. The method of claim 1 wherein the first hydrocarbon solvent is a light aromatic solvent.

8. The method of claim 7 wherein the light aromatic solvent comprises toluene, xylene, biodiesel, light distillate, and/or naphtha.

9. The method of claim 1 wherein the first hydrocarbon solvent has a boiling temperature of approximately 50° C. to 375° C.

10. The method of claim 1 wherein the liquid LPG includes propane and/or butane.

11. The method of claim 1 wherein the liquid LPG has a boiling temperature of approximately −80° C. to 10° C.

12. The method of claim 1 wherein the tar sands include approximately 3 wt % to 20 wt % of bitumen.

13. The method of claim 1 wherein at least approximately 90 wt % of the bitumen from the tar sands is extracted.

* * * * *